US012566355B2

(12) United States Patent
Thompson et al.

(10) Patent No.: US 12,566,355 B2
(45) Date of Patent: Mar. 3, 2026

(54) TIME-BIN QUBIT CONVERTER

(71) Applicant: PsiQuantum, Corp., Palo Alto, CA (US)

(72) Inventors: Mark G. Thompson, Chester (GB); Gabriel Mendoza, Mountain View, CA (US); Alain Shang, San Ramon, CA (US)

(73) Assignee: PsiQuantum, Corp., Palo Alto, CA (US)

( * ) Notice: Subject to any disclaimer, the term of this patent is extended or adjusted under 35 U.S.C. 154(b) by 0 days.

(21) Appl. No.: 18/662,156

(22) Filed: May 13, 2024

(65) Prior Publication Data

US 2025/0036006 A1    Jan. 30, 2025

Related U.S. Application Data

(63) Continuation of application No. 18/317,025, filed on May 12, 2023, now Pat. No. 12,019,354.

(60) Provisional application No. 63/364,624, filed on May 12, 2022.

(51) Int. Cl.
*G02F 3/00* (2006.01)
*G06N 10/40* (2022.01)

(52) U.S. Cl.
CPC ............... *G02F 3/00* (2013.01); *G06N 10/40* (2022.01)

(58) Field of Classification Search
CPC ................................... G02F 3/00; G06N 10/40
See application file for complete search history.

(56) References Cited

U.S. PATENT DOCUMENTS

| | | | |
|---|---|---|---|
| 11,475,347 B1 | 10/2022 | Rudolph et al. | |
| 11,536,897 B1 | 12/2022 | Thompson et al. | |
| 11,588,613 B1 | 2/2023 | Garrett et al. | |
| 12,019,354 B2 | 6/2024 | Thompson et al. | |
| 2014/0355998 A1 | 12/2014 | Tanzilli et al. | |
| 2019/0196100 A1 | 6/2019 | Nickerson et al. | |
| 2020/0301244 A1 | 9/2020 | Wang | |
| 2021/0141609 A1* | 5/2021 | Huang .................. H04L 9/0852 |
| 2021/0406757 A1 | 12/2021 | Kim et al. | |
| 2023/0252333 A1 | 8/2023 | Kim et al. | |
| 2023/0288637 A1 | 9/2023 | Hermans et al. | |
| 2023/0393447 A1 | 12/2023 | Thompson et al. | |

FOREIGN PATENT DOCUMENTS

| | | |
|---|---|---|
| AU | 2021364880 A1 | 6/2023 |
| CA | 3112785 A1 | 3/2020 |

(Continued)

OTHER PUBLICATIONS

Wang et al. Integrated photonic quantum technologies. Nature Photonics vol. 14, pp. 273-284 (2020). (Year: 2020).*

(Continued)

*Primary Examiner* — Collin X Beatty
(74) *Attorney, Agent, or Firm* — Schwegman Lundberg & Woessner, P.A.

(57) ABSTRACT

A system includes a first photonic integrated circuit. The circuit includes a qubit encoder configured to receive a spatial-mode qubit and convert the spatial-mode qubit to a temporal-mode qubit and an optical interconnect configured to receive and transmit the temporal-mode qubit. The system further includes a second photonic integrated circuit, itself including a qubit decoder configured to receive the temporal-mode qubit and convert the temporal-mode qubit back into the spatial-mode qubit.

21 Claims, 22 Drawing Sheets

(56) References Cited

FOREIGN PATENT DOCUMENTS

| | | | | |
|---|---|---|---|---|
| WO | WO-2018017659 A1 * | 1/2018 | ......... | G02B 6/12004 |
| WO | WO-2024054261 A2 | 3/2024 | | |
| WO | WO-2024054261 A3 | 4/2024 | | |

OTHER PUBLICATIONS

International Search Report and Written Opinion dated Feb. 29, 2024 in PCT Application No. PCT/US2023/022147.

Raymer, M. G., et al., "Temporal modes in quantum optics: then and now," Physica Scripta, vol. 95(6), 064002, Mar. 16, 2020, pp. 1-17.

Tittel, W., et al., "Photonic Entanglement for Fundamental Tests and Quantum Communication," Quantum Information and Computation, 2001, vol. 1(2), pp. 3-56.

U.S. Non-Final Office Action dated Oct. 25, 2023 in U.S. Appl. No. 18/317,025.

U.S. Notice of Allowance dated Feb. 13, 2024 in U.S. Appl. No. 18/317,025.

U.S. Appl. No. 18/317,025, 312 Amendment filed May 2, 2024, 6 pgs.

U.S. Appl. No. 18/317,025, PTO Response to Rule 312 Communication mailed May 15, 2024, 2 pgs.

U.S. Appl. No. 18/317,025, Response filed Jan. 22, 2024 to Non Final Office Action mailed Oct. 25, 2023, 7 pgs.

International Application Serial No. PCT/US2023/022147, International Preliminary Report on Patentability mailed Nov. 21, 2024, 8 pgs.

* cited by examiner

Qubit fiber connection

GENERATE SPATIAL-MODE QUBIT
1150

CONVERT SPATIAL-MODE QUBIT TO A TEMPORAL-MODE QUBIT
1155

TRANSMIT TEMPORAL-MODE QUBIT
1160

CONVERT TEMPORAL-MODE QUBIT INTO THE SPATIAL-MODE QUBIT
1165

1140

1400

Pump

SW CTRL signal
(RZ pulse)

tb CLK

Retimed SW
voltage

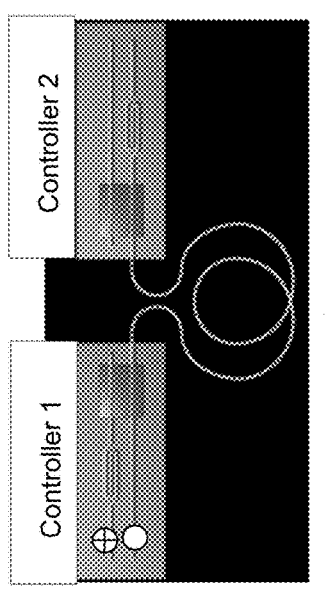
FIG. 15B
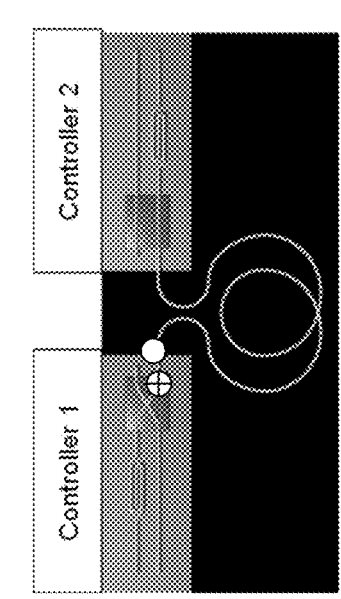
FIG. 15D
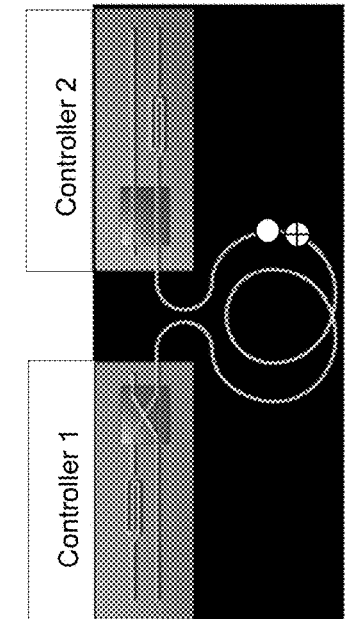
FIG. 15F
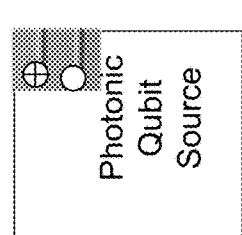
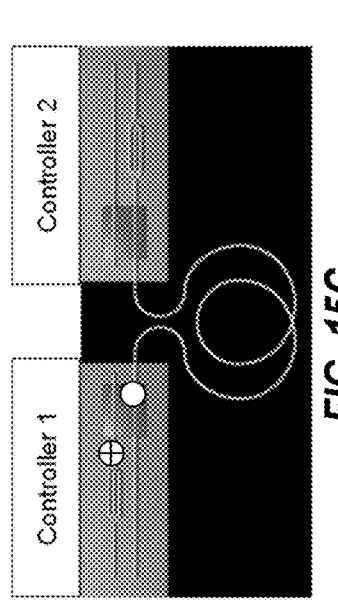
FIG. 15A
FIG. 15C
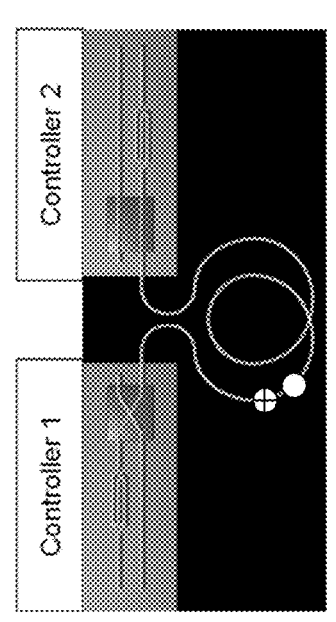
FIG. 15E

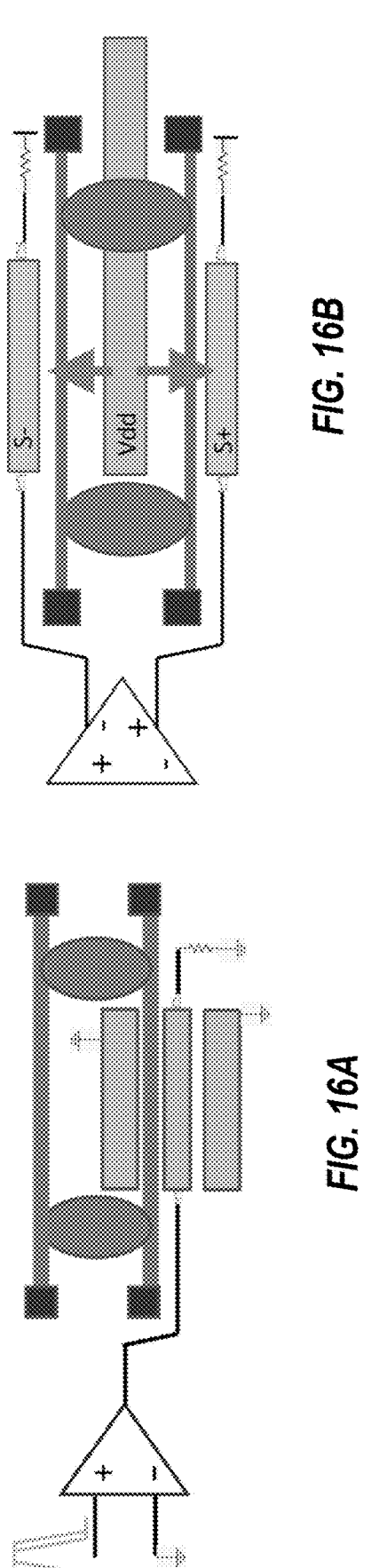
FIG. 16B
FIG. 16A
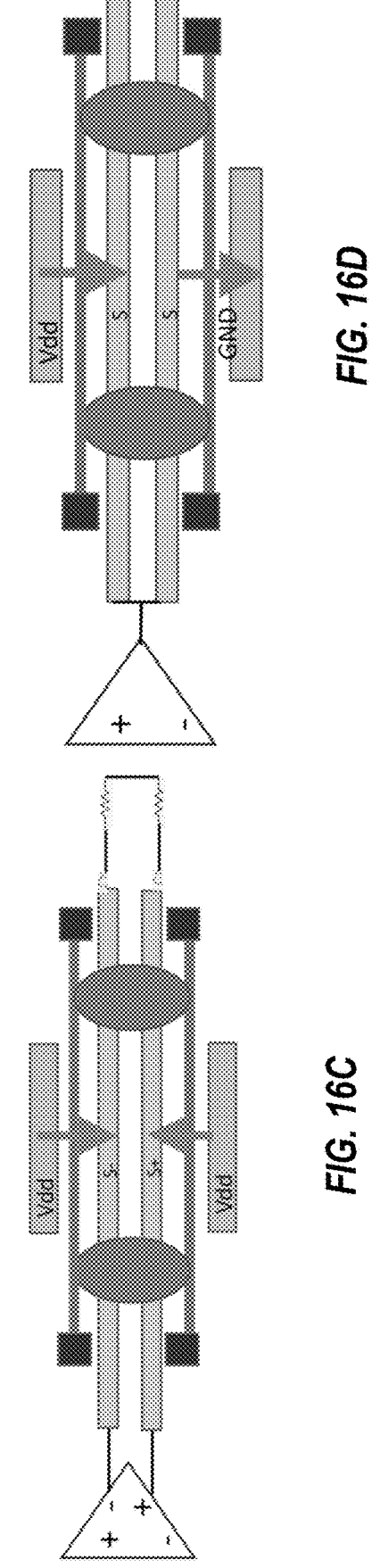
FIG. 16D
FIG. 16C

1700

Classical feedforward

Qubit fiber connection

TIME-BIN QUBIT CONVERTER

CROSS-REFERENCES TO RELATED APPLICATIONS

This patent application is a continuation of U.S. patent application Ser. No. 18/317,025, filed May 12, 2023, entitled "TIME-BIN QUBIT CONVERTER," which claims benefit of and priority to U.S. Provisional Patent Application Ser. No. 63/364,624, filed May 12, 2022, entitled "TIME-BIN QUBIT CONVERTER," the disclosures of which are assigned to the assignee hereof and are hereby incorporated by reference in their entireties for all purposes.

BACKGROUND

Photonic integrated circuits, such as silicon photonic integrated circuits, can be used in many systems, such as quantum communication systems and optical quantum computing systems. These quantum mechanics-based systems are distinguished from "classical" systems by their reliance on quantum states, such as quantum bits (qubits). To achieve the desired functions and performance, a quantum mechanics-based system may integrate many passive and active photonic devices, modules, and subsystems into the same system. For example, an optical quantum computer may need to integrate passive and active photonic integrated circuits and other optical and electrical components, such as optical fibers or other low-loss optical interconnects, control circuits, and classical processing units, into a same system to reliably generate, manipulate (e.g., entangle), and detect hundreds, thousands, or even millions of qubits for computing and error corrections, while achieving the desired functions and performance.

SUMMARY

Certain embodiments described herein relate to generating, converting, and transmitting quantum states (e.g., qubits) in systems such as optical quantum computers or quantum communication systems. Various inventive embodiments are described herein, including methods, processes, systems, devices, circuits, packages, modules, units, wafers, dies, networks, cells, and the like.

According to certain embodiments, a system may include a first photonic integrated circuit that may include a qubit encoder configured to receive a spatial-mode qubit and convert the spatial-mode qubit to a temporal-mode qubit. The system may also include an optical interconnect configured to receive and transmit the temporal-mode qubit, and a second photonic integrated circuit that may include a qubit decoder configured to receive the temporal-mode qubit and convert the temporal-mode qubit back into the spatial-mode qubit.

According to certain embodiments, a photonic integrated circuit device may include a dual-rail qubit bus optically coupled to a photonic qubit source, the dual-rail qubit bus including two waveguides, where a first waveguide of the dual-rail qubit bus may include a waveguide delay line that is disposed in a first layer of the photonic integrated circuit device. The photonic integrated circuit device may also include an optical switch disposed in a second layer of the photonic integrated circuit and optically connected to the two waveguides of the dual-rail qubit bus, and a control circuit configured to switch the optical switch to optically connect output portions of the two waveguides to a single output waveguide of the photonic integrated circuit at different times, where the control circuit is synchronized with the photonic qubit source.

According to certain embodiments, a method may include converting a spatial-mode qubit to a temporal-mode qubit using an optical delay and a switch of a first photonic integrated circuit; transmitting, on an optical interconnect, the temporal-mode qubit from the first photonic integrated circuit to a second photonic integrated circuit, the optical interconnect being coupled to the first photonic integrated circuit and the second photonic integrated circuit; and converting, on the second photonic integrated circuit, the temporal-mode qubit back into the spatial-mode qubit.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIGS. 15A-15L show an example of the propagation of the optical modes (indicated by yellow and red dots) of a qubit in a system that includes qubit converters according to certain embodiments.

FIGS. 16A-16D show various structures of Mach-Zehnder interferometers (MZIs) that may be used as the switches in the qubit converters disclosed herein according to certain embodiments.

DETAILED DESCRIPTION

Figure 1:
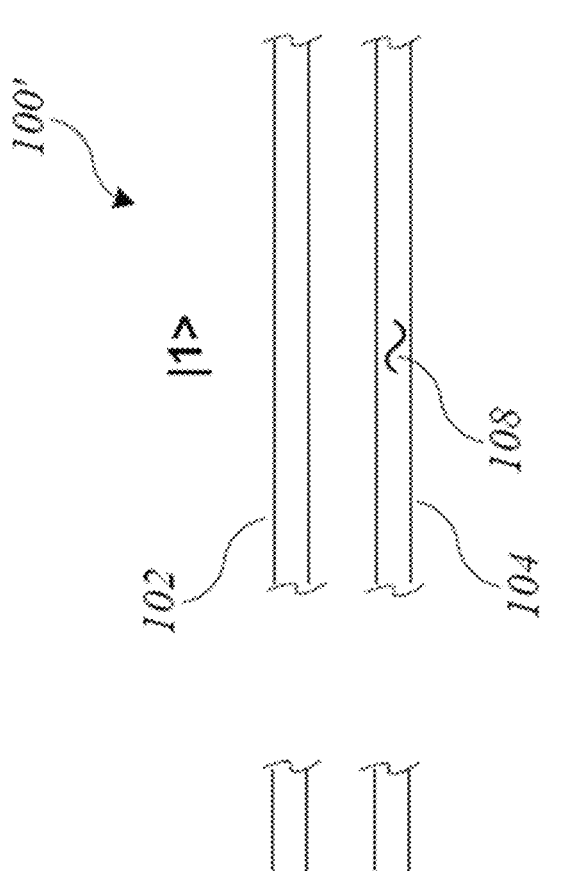
FIG. 1 shows two representations of a portion of a pair of waveguides corresponding to a dual-rail-encoded photonic qubit.
Figure 1:

Techniques disclosed herein relate generally to generating, converting, and transmitting quantum states (e.g., qubits) in systems such as optical quantum computers or quantum communication systems. Various inventive embodiments are described herein, including methods, processes, systems, devices, circuits, packages, modules, units, wafers, dies, networks, cells, and the like.

Quantum computing and quantum communication rely on the dynamics of quantum systems, such as photons, electrons, atoms, ions, molecules, nanostructures, and the like, which follow the rules of quantum theory. In quantum theory, the quantum state of a quantum system is described by a set of physical properties, the complete set of which is referred to as a quantum mode. A quantum mode can be defined by, for example, specifying the value (or distribution of values) of one or more properties of the quantum system. In cases where the quantum system is implemented using photons (referred to as "a photonic quantum system"), quantum modes may be defined by the frequency of the photon, the photon's position in space (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, orbital angular momentum, and the like. For the case of photons propagating in waveguides, the state of a photon may be represented by a quantum mode of a set of discrete spatiotemporal modes. For example, the spatial mode of the photon may be determined according to the waveguide in which the photon is propagating among a finite set of discrete waveguides, whereas the temporal mode of a photon may be determined based on the time period in which the photon is present among a set of discrete time periods. Other types of quantum mode, such as polarization modes, may also be used to specify the quantum state.

Many quantum computing or quantum communication systems may use quantum bits (qubits) that are each simultaneously in a coherent superposition of two states to manipulate information through quantum mechanics. Most technologies used to implement qubits have issues such as stability, decoherence, fault tolerance, and scalability issue. For example, one of the main challenges in realizing quantum computation is that decoherence and other quantum noise may destroy the information in a superposition of states in a quantum computer, and inaccuracies in quantum state transformations throughout the computation may accumulate, thus making long computations difficult. To overcome these issues, quantum error correction may be needed to achieve fault-tolerant quantum computation that can deal not only with noise on stored quantum information, but also with faulty quantum gates, faulty quantum preparation, and faulty measurements. In some systems, for the purposes of quantum error correction, many physical qubits may be used to produce an entity (referred to as a logical qubit) which behaves logically as a single qubit would in a quantum circuit or algorithm. Some quantum error correction techniques may store the information of one qubit onto a highly entangled state of multiple qubits, such as 7, 9, or more physical qubits. When more than one level of encoding is performed to provide better protection, thousands or more of physical qubits may be needed for each logical qubit. Thus, a logical qubit, such as an error-corrected photonic logical qubit or a fault tolerate photonic channel, may include many entangled physical qubits to provide the stability, error-correction, and fault tolerance needed to perform useful computations. For a quantum computer that may use many logical qubits for computing, thousands or millions of physical qubits may need to be generated, entangled, switched, and detected, which may need a large number of passive and active photonic circuits and components and electric circuits and components to implement. It can be very challenging to integrate these circuits and components into a system that can achieve the desired functions and performance.

When the qubits are implemented using, for example, dual rails, pairs of optical fibers may need to be used to transmit qubits between chips or other modules. When pairs of optical fibers are used, the fibers in each pair may experience different environments, such as different temperatures, different stresses, and different coupling conditions, and thus there may be different delays or phase changes for photons propagating on different optical fibers.

According to certain embodiments, on a transmitter side, spatial-mode qubits may be converted to temporal-mode qubits using a delay line and a switch controlled by a clock signal. In this way, the qubits may be transmitted on a same optical fiber and thus may experience the same environment on the propagation path. In some embodiments, on the receiver side, the received temporal-mode qubits may be converted to spatial-mode qubits using a delay line and a switch controlled by a clock signal. The transmitter and the receiver (and the clock signals) may be synchronized. The clock signals may also be synchronized with the qubit generators. For example, the clock signals may be generated using excess pump photons unused by single photon generators.

As used herein, a "qubit" (or quantum bit) refers to a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of atoms, ions, nuclei, or photons. Other examples may include other engineered quantum systems such as flux qubits, phase qubits, or charge qubits (e.g., formed from a superconducting Josephson junction); topological qubits (e.g., *Majorana fermions*); or spin qubits formed from vacancy centers (e.g., nitrogen vacancies in diamond). A physical qubit may be a physical device that behaves as a two-state quantum system. In one example, a qubit can be "dual-rail encoded" such that the logical value of the qubit is encoded by the occupation of one of two modes of the quantum system.

As used herein, a "resource state" refers to an entangled state of a number of qubits in a non-separable entangled state (which is an entangled state that cannot be decomposed into smaller separate entangled states). In various embodiments, the number of qubits of a resource state can be a small number (e.g., two or more, or any number up to about 20) or a larger number (as large as desired).

As used herein, a "logical qubit" refers to a physical or abstract qubit that has a long enough coherence time to be usable by quantum logic gates. A logical qubit may specify how a single qubit should behave in a quantum algorithm, subject to quantum logic operations by quantum logic gates. Due to issues such as stability, decoherence, fault tolerance, and scalability associated with a physical qubit that includes a single two-state quantum system, physical qubits may not be used to reliably encode and retain information for a sufficiently long period of time to be useful. Therefore, quantum error correction may need to be used to produce scalable quantum computers, where many physical qubits may be used to create a single, error-tolerant logical qubit.

Depending on the error-correction scheme used and the error rates of each physical qubit, a single logical qubit may be formed using a large number (e.g., tens, hundreds, thousands, or more) of physical qubits. As used in the following sections, the term "qubit" generally refers to a physical qubit, whereas all references to logical qubits include the qualifier "logical."

As used herein, a "quantum system" may include particles (such as atoms, ions, nuclei, and/or photons) or engineered quantum systems, such as flux qubits, phase qubits, or charge qubits (e.g., formed from a superconducting Josephson junction), topological qubits (e.g., *Majorana fermions*), spin qubits formed from vacancy centers (e.g., nitrogen vacancies in diamond), qubits otherwise encoded in multiple quantum systems (e.g., Gottesman-Kitaev-Preskill (GKP) encoded qubits), entangled states of qubits, and the like.

As used herein, "fusion" (or "a fusion operation" or "fusing") refers to a two-qubit entangling measurement. A "fusion gate" is a structure that receives two input qubits, each of which is typically part of an entangled state of qubits. The fusion gate may perform a projective measurement operation on the input qubits to produce either one (e.g., in "type I fusion") or zero (e.g., in "type II fusion") output qubit in a manner such that the initial two entangled states of qubits are fused into a single entangled state of qubits. Fusion gates are specific examples of a general class of two-qubit entangling measurements and are particularly suited for photonic architectures.

Several illustrative embodiments will now be described with respect to the accompanying drawings. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, orbital angular momentum, and the like.

For the case of photons propagating in a waveguide, it is convenient to express the state of the photon as one of a set of discrete spatial-temporal modes. For example, the spatial mode $k_i$ of the photon is determined according to which one of a finite set of discrete waveguides the photon is propagating in, and the temporal mode $t_j$ is determined by which one of a set of discrete time periods (referred to herein as "bins") the photon is present in. The degree of temporal discretization can be provided by a pulsed laser which is responsible for generating the photons. In examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Further, in the description that follows, embodiments will be described that employ photonic waveguides to define the spatial modes of the photon. However, persons of ordinary skill in the art with access to this disclosure will appreciate that other types of mode, e.g., temporal modes, energy states, and the like, can be used without departing from the scope of the present disclosure. In addition, persons of ordinary skill in the art will be able to implement examples using other types of quantum systems, including but not limited to other types of photonic systems.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. For example, a multi-mode, two particle Fock state $|1001\rangle_{1,2,3,4}$ specifies a two-particle quantum state with one particle in mode 1, zero particles in mode 2, zero particles in mode 3, and one particle in mode 4. Again, as introduced above, a mode can be any property of the quantum object. For the case of a photon, any two modes of the electromagnetic field can be used, e.g., one may design the system to use modes that are related to a degree of freedom that can be manipulated passively with linear optics. For example, polarization, spatial degree of freedom, or angular momentum could be used. The four-mode system represented by the two particle Fock state $|1001\rangle_{1,2,3,4}$ can be physically implemented as four distinct waveguides with two of the four waveguides having one photon travelling within them. Other examples of a state of such a many-body quantum system include the four-particle Fock state $|1111\rangle_{1,2,3,4}$ that represents each mode occupied by one particle and the four-particle Fock state $|2200\rangle_{1,2,3,4}$ that represents modes 1 and 2 respectively occupied by two particles and modes 3 and 4 occupied by zero particles. For modes having zero particles present, the term "vacuum mode" is used. For example, for the four-particle Fock state $|2200\rangle_{1,2,3,4}$ modes 3 and 4 are referred to herein as "vacuum modes." Fock states having a single occupied mode can be represented in shorthand using a subscript to identify the occupied mode. For example, $|0010\rangle_{1,2,3,4}$ is equivalent to $|1\_3\rangle$.

As used herein, a "qubit" (or quantum bit) is a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of atoms, ions, nuclei, or photons. Other examples include other engineered quantum systems such as flux qubits, phase qubits, or charge qubits (e.g., formed from a superconducting Josephson junction); topological qubits (e.g., *Majorana fermions*); or spin qubits formed from vacancy centers (e.g., nitrogen vacancies in diamond).

A qubit can be "dual-rail encoded" such that the logical value of the qubit is encoded by occupation of one of two modes of the quantum system. For example, the logical 0 and 1 values can be encoded as follows:

$$|0\rangle_L = |10\rangle_{1,2} \qquad (1)$$

$$|1\rangle_L = |01\rangle_{1,2} \qquad (2)$$

where the subscript "L" indicates that the ket represents a logical state (e.g., a qubit value) and, as before, the notation $|ij\rangle_{1,2}$ on the right-hand side of the equations above indicates that there are i particles in a first mode and j particles in a second mode, respectively (e.g., where i and j are integers). In this notation, a two-qubit system having a logical state $|0\rangle|1\rangle_L$ (representing a state of two qubits, the first qubit being in a '0' logical state and the second qubit being in a '1' logical state) may be represented using occupancy across four modes by $|1001\rangle_{1,2,3,4}$ (e.g., in a photonic system, one photon in a first waveguide, zero photons in a second waveguide, zero photons in a third waveguide, and one photon in a fourth waveguide).

Qubits (and operations on qubits) can be implemented using a variety of physical systems. In some examples described herein, qubits are provided in an integrated photonic system employing waveguides, beam splitters, photonic switches, and single photon detectors, and the modes that can be occupied by photons are spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion.

In some embodiments of a photonic quantum computing system using dual-rail encoding (also referred to herein as spatial mode), a qubit can be implemented using a pair of waveguides. FIG. 1 shows two representations (100, 100') of a portion of a pair of waveguides 102, 104 that can be used to provide a dual-rail-encoded photonic qubit. At 100, a photon 106 is in waveguide 102 and no photon is in waveguide 104 (also referred to as a vacuum mode); in some embodiments, this corresponds to the $|\text{—}0\rangle_L$ state of a photonic qubit. At 100', a photon 108 is in waveguide 104, and no photon is in waveguide 102; in some embodiments this corresponds to the $|\text{—}1\rangle_L$ state of the photonic qubit. To prepare a photonic qubit in a known logical state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel.

Occupied modes can be created by using a photon source to generate a photon that then propagates in the desired waveguide. A photon source can be, for instance, a resonator-based source that emits photon pairs, also referred to as a heralded single photon source. In one example of such a source, the source is driven by a pump (e.g., a light pulse) that is coupled into a system of optical resonators that, through a nonlinear optical process (e.g., spontaneous four wave mixing (SFWM), spontaneous parametric down-conversion (SPDC), second harmonic generation, or the like), can generate a pair of photons. Many different types of photon sources can be employed. Examples of photon pair sources can include a micro-ring-based spontaneous four wave mixing (SPFW) heralded photon source (HPS). However, the precise type of photon source used is not critical and any type of nonlinear source, employing any process, such as SPFW, SPDC, or any other process can be used. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SPWM and SPDC, such as optomechanical systems and the like.

In such cases, operation of the photon source may be non-deterministic (also sometimes referred to as "stochastic") such that a given pump pulse may or may not produce a photon pair. In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible. For instance, active multiplexing schemes that employ log-tree, generalized Mach-Zehnder interferometers, multimode interferometers, chained sources, chained sources with dump-the-pump schemes, asymmetric multi-crystal single photon sources, or any other type of active multiplexing architecture can be used. In some embodiments, the photon source can employ an active multiplexing scheme with quantum feedback control and the like. In some embodiments described below, use of multi-rail encoding allows the probability of a band having one mode become occupied during a given pulse cycle to approach 1 without active multiplexing.

Measurement operations can be implemented by coupling a waveguide to a single photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode.

Figure 2:
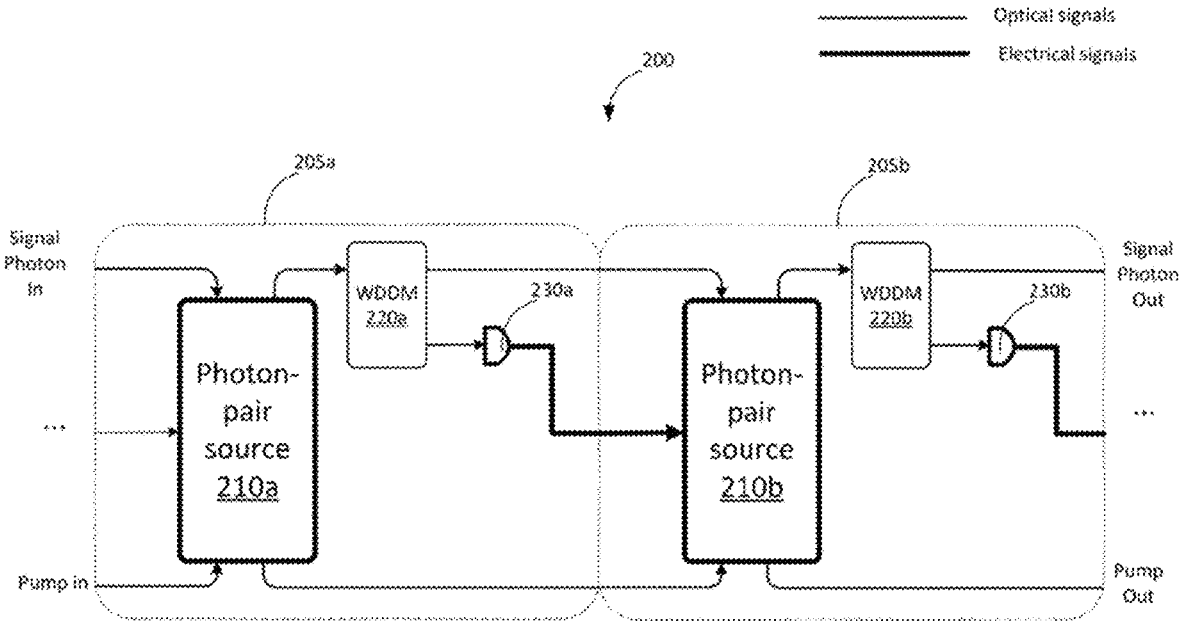
FIG. 2 is a simplified block diagram of an example of a single-photon source that includes a set of cascaded heralded photon sources (HPS's) according to some embodiments.

FIG. 2 is a simplified block diagram of an example of a single-photon source 200 that may include a set of cascaded HPS's according to some embodiments. In the example shown in FIG. 2, the single-photon source 200 may include multiple HPS's 205a, 205b, and the like, which may be collectively referred to as HPS's 205. Each HPS 205 may include a photon-pair source, such as the photon-pair source 210a in HPS 205a or the photon-pair source 210b in HPS 205b. Each photon-pair source 210a or 210b may generate a pair of photons based on, for example, spontaneous four wave mixing (SFWM) in third-order passive nonlinear optical materials or spontaneous parametric down-conversion (SPDC) in second-order passive nonlinear optical materials. In some implementations, a photon-pair source 210a or 210b may include a ring resonator that may support multiple resonances as described below.

It will be appreciated that although some embodiments are described in relation to a photon-pair source, this is not required and photon sources other than photon-pair sources are included within the scope of the present invention. Thus, for the sake of illustration, a micro-ring based SPFW heralded photon source (HPS) is described as an example of the source of photons. However, the precise type of photon source used is not critical and any type of nonlinear source, employing any process, such as SPFW, spontaneous parametric down-conversion (SPDC), or any other process can be used. Other classes of sources that do not necessarily require a nonlinear material can also be employed, such as those that employ atomic and/or artificial atomic systems can be used, e.g., quantum dot sources, color centers in crystals, and the like.

In some cases, sources may or may be coupled to photonic cavities, e.g., as can be the case for artificial atomic systems such as quantum dots coupled to cavities. Other types of photon sources also exist for SPWM and SPDC, such as optomechanical systems and the like.

For the sake of illustration, an example which employs spatial multiplexing of several non-deterministic is described as an example of a multiplexed (MUX) photon source. However, many different spatial MUX architectures are possible without departing from the scope of the present disclosure. Temporal MUXing can also be implemented instead of or in combination with spatial multiplexing. MUX schemes that employ log-tree, generalized Mach-Zehnder interferometers, multimode interferometers, chained sources, chained sources with dump-the-pump schemes, asymmetric multi-crystal single photon sources, or any other type of MUX architecture can be used. In some embodiments, the photon source can employ a MUX scheme with quantum feedback control and the like.

In each photon-pair source 210a or 210b, photons may be non-deterministically produced in pairs, where each pair includes a signal photon and an idler photon, the existence of one photon (e.g., the idler photon) may indicate the existence of the other photon (e.g., the signal photon) in the pair. The two photons in each pair may be separated to two output channels by a splitter, for example a wavelength division demultiplexing (WDDM) device 220a or 220b, based on their different frequencies. One photon (e.g., the idler photon) on one output channel of the splitter (e.g., WDDM device 220a or 220b) may be detected by a single photon detector (SPD) 230a or 230b. If a photon is detected by an SPD 230a or 230b, a corresponding photon (e.g., the signal photon) that is generated in the same pair as the detected photon would exist on a different output channel of the splitter (e.g., WDDM device 220a or 220b), and thus can be used as the output of the single-photon source 200. When an idler photon is detected by an SPD 230a or 230b in one of the cascaded HPS's 205a and 205b, the SPD 230a or 230b may send an electrical signal (referred herein as a heralding signal) to the other HPS's, so that those HPS's may be switched off or bypassed. For instance, in the example shown in FIG. 2, if a photon is detected by the SPD 230a in the first HPS 205a, the SPD 230a may send a heralding signal to the second HPS 205b, so that the second HPS 205b may be turned off or bypassed. The signal photon generated by the first HPS 205a may pass through the second HPS 205b as an output of single-photon source 200.

Figure 3:
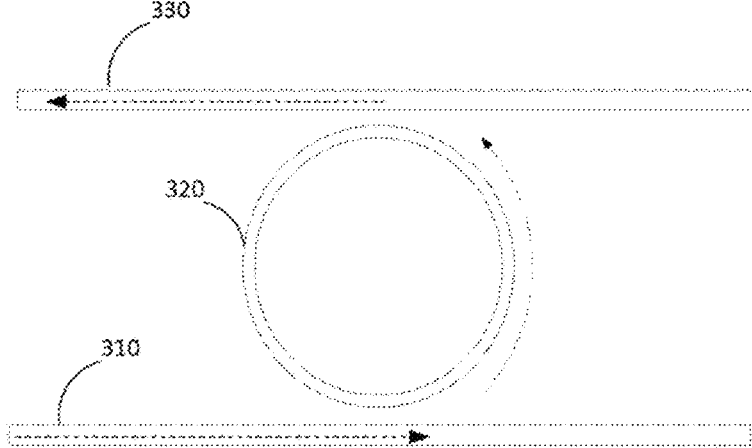
FIG. 3 illustrates an example of a photon-pair source according to some embodiments.

FIG. 3 illustrates an example of a photon-pair source 300 according to some embodiments. The photon-pair source 300 may include a first waveguide 310, a second waveguide 330, and a ring resonator 320 positioned between the first waveguide 310 and the second waveguide 330. Pump light (e.g., generated by a laser source) may be propagated in the first waveguide 310 (as indicated by the arrow), and may be coupled into the ring resonator 320. The ring resonator 320 may include a waveguide loop such that a resonance for light having a certain wavelength may occur when the optical path length of the ring resonator 320 is an integer number of the wavelength of the light. The ring resonator 320 may support multiple resonances at multiple wavelengths that may meet the resonance condition. The spacing between these resonances may be referred to as the free spectral range (FSR) and may depend on the optical path length of the ring resonator 320.

The ring resonator 320 may include a nonlinear optical material, such as a second-order or third-order passive nonlinear optical medium. Spontaneous four wave mixing (SFWM) or spontaneous parametric down-conversion (SPDC) process may occur in the ring resonator 320. In an SFWM process, two pump photons may be converted into a pair of daughter photons (e.g., a signal photon and an idler photon) in the nonlinear optical material. Due to energy conservation, the signal photon and the idler photon may be at frequencies that are symmetrically distributed around the pump frequency (e.g., one at frequency $f_0+\Delta f$, the other one at frequency $f_0-\Delta f$, where $f_0$ is the frequency of pump photons).

The signal photon and the idler photon generated within the ring resonator 320 may be coupled out of the ring resonator 320 into the second waveguide 330 at a certain coupling efficiency. The propagation directions of the photons in the first waveguide 310, the ring resonator 320, and the second waveguide 330 may be as shown by the arrows in FIG. 3. In addition to photon pairs that are generated by the resonator 320, certain amount of unconverted pump photons may also be coupled from the ring resonator 320 into the second waveguide 330.

The photon-pair source 300 may generate photon pairs in a non-deterministic manner. That is, the photon pairs are not generated on-demand, but instead are generated probabilistically. The success rate may be only 1-5%. For example, a photon pair may be successfully generated only once in every 20 pump pulses. As a result, a heralded photon source (HPS) that uses a photon-pair source 300 to generate single photons (e.g., the HPS 205a or 205b illustrated in FIG. 2) may also generate single photons in a non-deterministic manner. According to some embodiments, multiple HPS's may be cascaded (e.g., as illustrated in FIG. 2), or multiplexed to form a quasi-deterministic single-photon source, as described below.

Figures 4A, 4B, 4C:
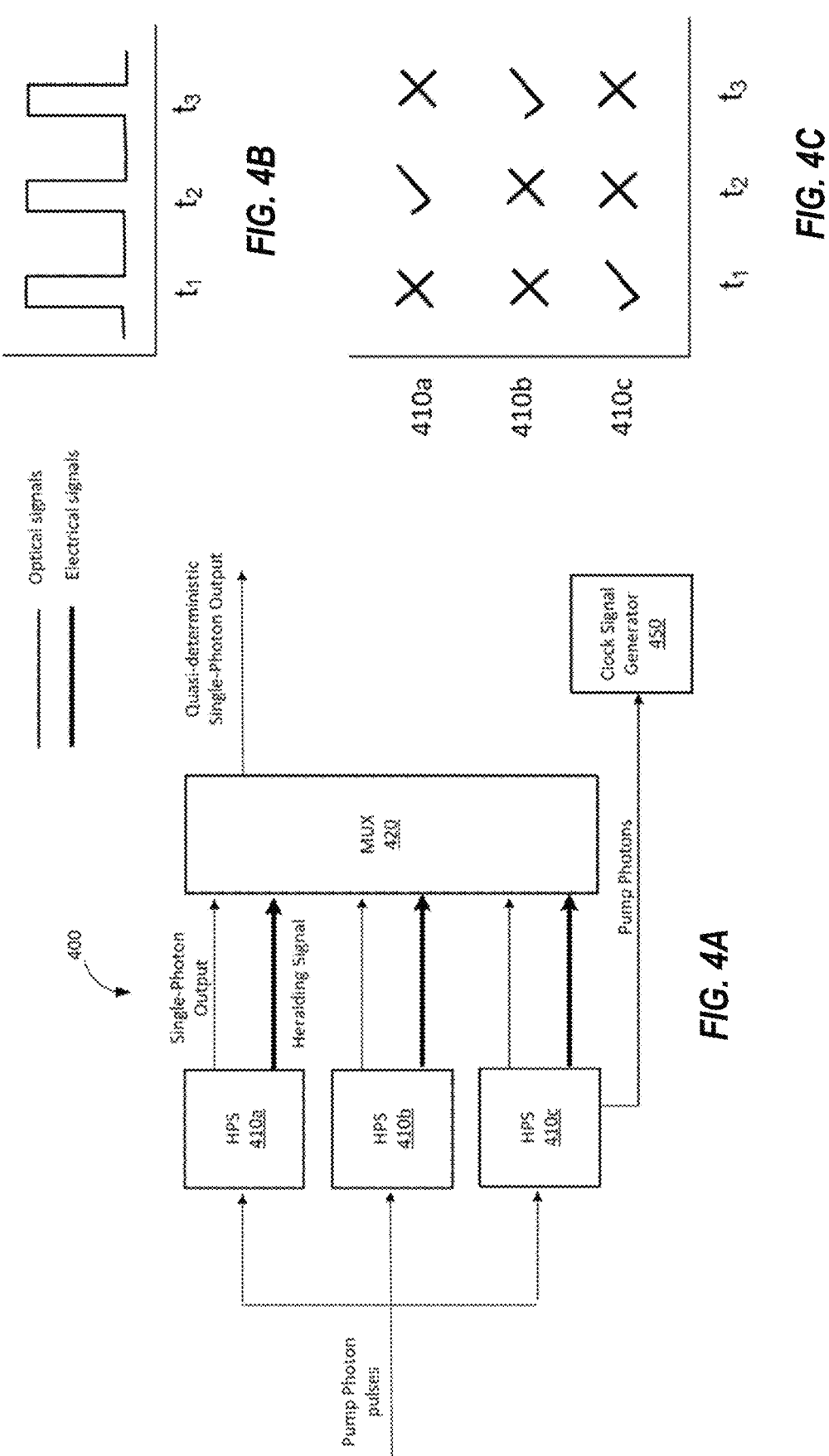
FIG. 4A illustrates an example of a single-photon source that includes several HPS's that are multiplexed according to some embodiments.
FIG. 4B illustrates schematically a train of pump photon pulses that arrive at the HPS's shown in FIG. 4A according to some embodiments.
FIG. 4C illustrates the non-deterministic manner in which the HPS's illustrated in FIG. 4A generate single photons.

FIG. 4A shows, as an example, a single-photon source 400 that includes three HPS's 410a-410c that are multiplexed. Pump photon pulses (e.g., laser pulses) are distributed to each HPS 410a, 410b, and 410c, for example, simultaneously. The outputs of the HPS's 410a-410c are coupled to a multiplexer (MUX) 420. FIG. 4 shows a single-photon source 400 that includes three HPS's for illustration purposes, a single-photon source may include twenty or more HPS's in some embodiments.

Each of the HPS's 410a-410c may generate single photons in a non-deterministic manner. For example, FIG. 4B illustrates schematically a train of pump photon pulses that arrive at the HPS's 410a, 410b, and 410c at time slots $t_1$, $t_2$, and $t_3$. As illustrated in FIG. 4C, the first HPS 410a may not generate any single photon at the first time slot $t_1$ and the third time slot $t_3$ (indicated by the crosses), but may generate a single photon at the second time slot $t_2$ (indicated by the check symbol). Similarly, the second HPS 410b may not generate any single photon at the first time slot $t_1$ and the second time slot $t_2$, but may generate a single photon at the third time slot $t_3$; and the third HPS 410c may not generate any single photon at the second time slot $t_2$ and the third time slot $t_3$, but may generate a single photon at the first time slot $t_1$.

When an idler photon is detected (e.g., by a single-photon detector) in a HPS 410a, 410b, or 410c, the HPS 410a, 410b, or 410c may send a heralding signal to the multiplexer 420. The multiplexer 420 may be configured to select the single-photon output of one of the HPS's 410a, 410b, and 410c as its single photon output, and ignore the single-photon outputs of all other HPS's. When there are sufficient number of HPS's, the single-photon source 400 may be able to produce a single photon for each pump photon pulse in a quasi-deterministic manner. For instance, in the example illustrated in FIGS. 4A-4C, the multiplexer 420 may select the single-photon output of the third HPS 410c at the first time slot $t_1$, the output of the first HPS 410a at the second time slot $t_2$, and the output of the second HPS 410b at the third time slot $t_3$, so that the single-photon source 400 outputs a single phone for each of the pump photon pulses at time slots $t_1$, $t_2$, and $t_3$.

In order for the system to deterministically sequence the multiple operations of the various components, including, e.g., one or more single-photon sources like 400a, 400b, 400c, one or more MUXes like MUX 420, and/or any other downstream components, a shared, or master, clock signal may be beneficial. Accordingly, in some embodiments, the clock signal generator 450 can convert a portion of the pump photon pulses to a clock signal that then can be distributed to the various components to conduct the desired coordination between components. While the portion of the pump signal used to derive the clock signal shown in FIG. 4A is derived from an output of a single photon source, the portion can be provided from any number different upstream or combination of blocks without departing from the scope of the present disclosure.

Single photons generated by the single-photon sources may be coupled into a qubit entangling system, which may include, e.g., complex linear optical circuits (e.g., there may be up to a million qubits). the linear optical circuits may include, for example, integrated optical components such as switches, beam splitters, phase shifters, and photon detectors that need to be coordinated in order to entangle two or more single photons or two or more entangled cluster states of photons. The linear optical circuits may also include, for example, quantum gates (e.g., fusion gates) at various locations to perform the quantum computing. In some architectures, the quantum gates may be formed/defined by a sequence of measurement and/or fusion operations that are to be performed on the individual photons. As such, there may be a large number of operations within the quantum computer that may need to be precisely timed. A precise system clock may be needed to control the timing of various operations of the quantum computing system.

In some embodiments, the system clock may be set by the photon generation rate of the single-photon sources. As described above, the single-photon sources may be driven by a high-power pump laser that produces a train of pump photon pulses at certain repetition rate (e.g., pulses at about 50-ps to 1-ns spacing, corresponding to a repetition rate of about 1 GHz to about 20 GHz). The high-power pump laser may in turn be driven by an electrical signal having a similar repetition rate. Thus, one option for generating a clock signal is to tap off some of the electrical signals that generate the pump photon pulses and pipe it to the linear optical quantum computer to be used as a master clock. However, there may be many electrical and optical interconnects between the pump photon source and the linear optical quantum computer that are subject to different temperature environments (e.g., from room temperature of about 293 K to about 4 K inside the cryostat). As a result, a master clock generated in this way may have random phase errors. Because of the tight timing tolerances required by a linear optical quantum computer, the phase errors may render such as master clock unsuitable for use for the linear optical quantum computer.

In some embodiments, some clock signals for a photonic quantum computer may be generated using the excess pump photons rejected by the single-photon sources or pump photons that are not coupled into the single-photon sources. In some embodiments, some clock or control signals may be generated from the heralding signals when idler photons are detected in a heralded photon source (HPS).

Figure 5:
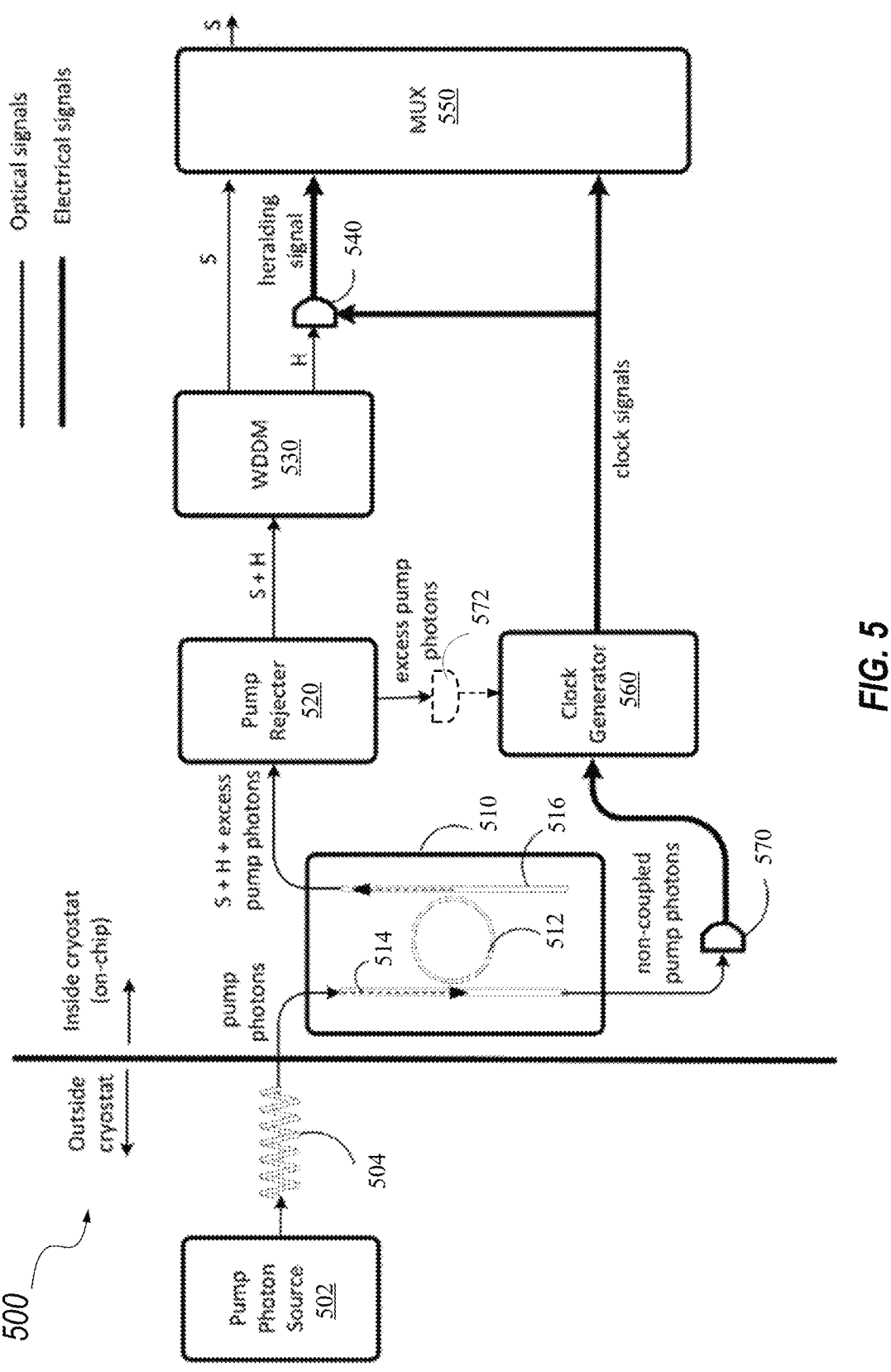
FIG. 5 illustrates a schematic block diagram of an example of a system for generating clock signals for a photonic quantum computer according to some embodiments.

FIG. 5 illustrates a schematic block diagram of an example of a system 500 for generating clock signals for a photonic quantum computer according to some embodiments. In the illustrated example, system 500 may include a pump photon source 502 that resides at room temperature outside a cryostat, and a photon-pair source 510 that resides inside the cryostat. The photon-pair source 510 is coupled to the pump photon source 502 via a waveguide 504. The photon-pair source 510 may include a first waveguide 514, a resonator 512 optically coupled to the first waveguide 514, and a second waveguide 516 optically coupled to the resonator 512, as described above with respect, for example, FIG. 3. A portion of the pump photons may be coupled from the first waveguide 514 into the resonator 512, while a remaining portion of the pump photons may exit the first waveguide 514 as non-coupled pump photons. The resonator 512 may convert some of the pump photons into pairs of signal photon and heralding photon. The converted photon pairs, as well as the excess pump photons that are not converted, may be coupled into the second waveguide 516 as output.

The output of the photon-pair source 510 may be coupled into a pump rejecter 520. The pump rejecter 520 separates the signal photon (S) and the heralding photon (H) from the excess pump photons, for example via spectral filtering. The excess pump photons may be absorbed by a beam dump (not shown). The signal photon and the heralding photon are in turn separated by a wavelength division demultiplexing (WDDM) device 530. The heralding photon may be detected by a single-photon detector 540, which generates an electrical heralding signal. The heralding signal can be used by a multiplexer 550 for multiplexing signal photons generated by a plurality of photon-pair sources.

The system may further include a photodetector 570 and a clock generator 560. The photodetector 570 may take the non-coupled pump photons from the first waveguide 514 of the photon-pair source 510 as input, and generate electrical pulses to be input into the clock generator 560. In some embodiments, a photodetector 572 may be used to take the excess pump photons rejected by the pump rejecter 520 as input, and generate electrical pulses to be input into the clock generator 560. Because the photon-pair source 510 is placed on the chip inside a cryostat, the clock signals generated in this way may also be synchronized with the phases of the single photons generated by the single-photon source, and undesirable phase errors and drifts may be prevented or reduced.

The clock signals may be input to the multiplexer 550 for controlling the operations of the multiplexer 550. For example, the clock signals may be used to control the timing of multiplexing. In some embodiments, the clock signals may also be input to the single-photon detector 540 for controlling the operation of the single-photon detector 540. For example, the clock signals may be used to control when the single-photon detector 540 should be turned on and off. In some embodiments, outputs of single-photon detector 540 may be used as a clock or another control signal (e.g., a feedforward control signal) for controlling operations of other circuits, such as multiplexer 550.

Figures 6A, 6B:
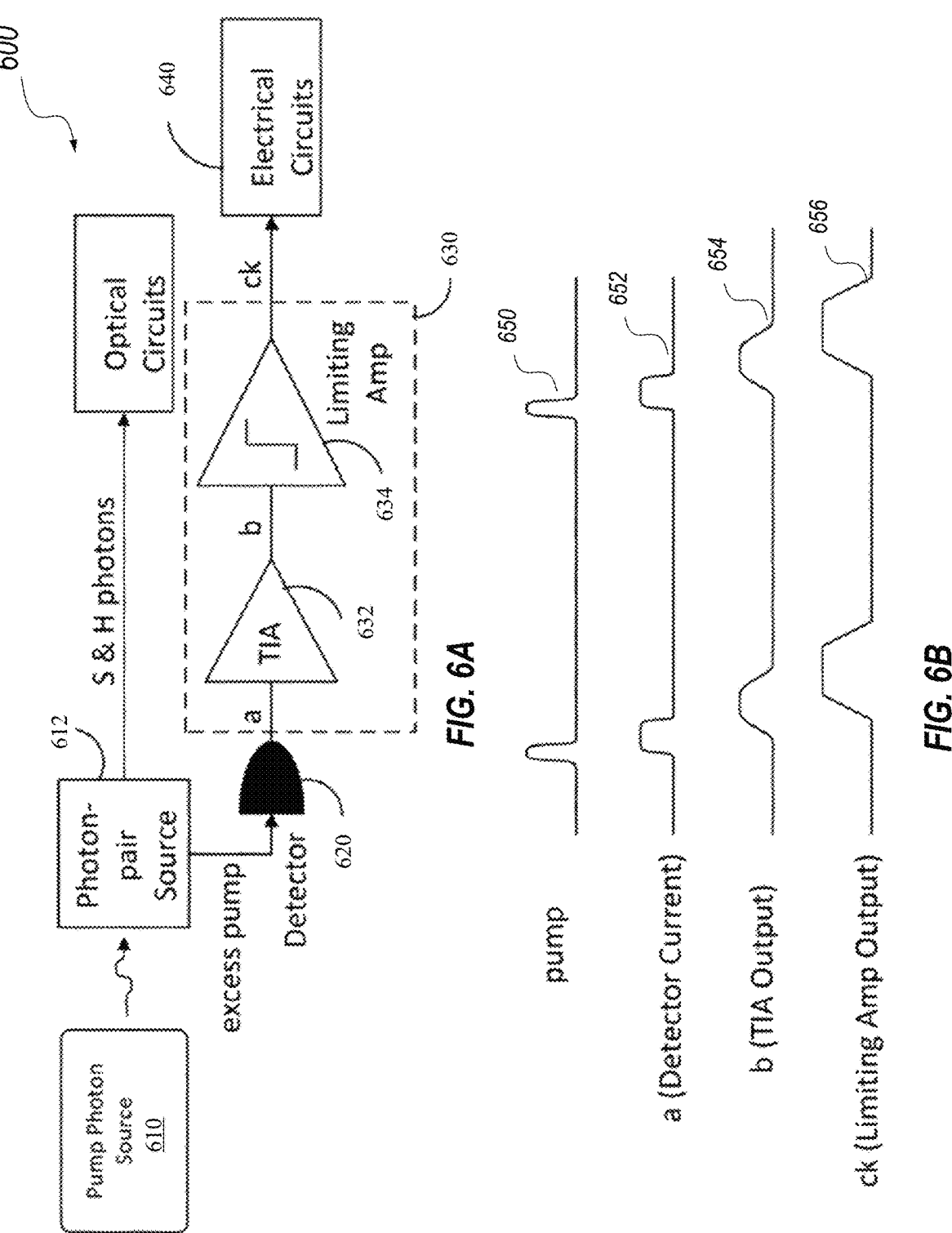
FIG. 6A is a simplified schematic diagram illustrating an example of a system including a clock signal generator according to certain embodiments.
FIG. 6B includes a set of plots illustrating optical and electrical signals associated with various elements of the system illustrated in FIG. 6A.

FIG. 6A is a simplified schematic diagram illustrating an example of a system 600 including a clock signal generator according to an embodiment of the present invention. FIG. 6B is a set of plots illustrating optical and electrical signals associated with various elements of the system illustrated in FIG. 6A. The clock signal generator 630 illustrated in FIG. 6A can be utilized as any of the clock signal generators described in this application, for example, clock generator 560. As illustrated in FIG. 6A, system 600 includes a pump photon source 610 and a photon-pair source 612, which may be examples of pump photon source 502 and photon-pair source 510 in FIG. 5, respectively. The optical signal, e.g., optical pulses, delivered by pump photon source 610 is illustrated as a plot 650 for the pump in FIG. 6B.

Excess pump photons are delivered to detector 620, such as photodetector 570 or 572 in FIG. 5. Detector 620 converts the excess pump photons into electrical pulses. The electrical pulses output by detector 620 are illustrated as a plot 652 ("a", i.e., Detector Current). Clock signal generator 630 receives the electrical pulse output by detector 620 and includes a transimpedance amplifier (TIA) 632 and a limiting amplifier 634. The output of the TIA 632 is illustrated as a plot 654 ("b," i.e., TIA Output) in FIG. 6B. The limiting amplifier 634 thus outputs the clock signal 656 ("ck," i.e., Limiting Amp Output) illustrated in FIG. 6B. The clock signal 656 ("ck") can be considered as the recovered electrical clock from the pump photon source and provided to electrical circuits 640 as described herein.

To achieve the desired function for quantum computing (e.g., generating, manipulating, and detecting qubits), a photonic quantum computing module may include an optical backplane that includes at least one optical waveguide layer, and a plurality of die stacks on the optical backplane. Each die stack of the plurality of die stacks may include a photonic integrated circuit (PIC) die and an electronic integrated circuit (EIC) die bonded to the PIC die. The PIC die may include a photonic integrated circuit optically coupled to the at least one optical waveguide layer of the optical backplane. The EIC die may include an electronic integrated circuit for controlling operations of the photonic integrated circuit of the PIC die. The at least one optical waveguide layer may include waveguides optically coupled to at least two die stacks of the plurality of die stacks. The waveguides are configured to transport, between the at least two die stacks of the plurality of die stacks, a photonic quantum system that includes a photon in one of two or more quantum modes. The two or more quantum modes may include, for example, two or more different frequencies, two or more different positions (e.g., a waveguide or superposition of waveguides a photon is propagating within), two or more different directions of propagation, two or more different polarization states, two or more different time windows, two or more different orbital angular momentums, or the like. The photonic quantum system may include, for example, a single photon, a qubit, a qudit, an entangled state of qubits, or a logical qubit. The photonic integrated circuit may include a single photon source configured to generate the photon. In some embodiments, the at least one optical waveguide layer may include at least one of a pair of waveguides or a waveguide configured to transport photons in two or more quantum modes.

As described above, in some embodiments, a qubit may be physically realized using a pair of waveguides into which a single photon is introduced. Qubits can be operated upon using mode couplers (e.g., beam splitters), variable phase shifters, photon detectors, and the like. For instance, entanglement between two (or more) qubits can be created by providing mode couplers between waveguides associated with different qubits. As also described above, physical qubits may suffer from loss and noise. Consequently, relying on single physical qubits (e.g., a photon propagating in a pair of waveguides) when performing a quantum computation may result in an unacceptably high error rate. To provide fault tolerance, photonic quantum computers can be designed to operate on one or more logical qubits, where a logical qubit is a multi-qubit quantum system in an entangled state that enables error correction (also referred to herein as an error correcting code). For example, in some embodiments, the structure of the error correcting code can be represented as a graph in three dimensions. In the context of quantum computing, logical qubits can improve robustness by supporting error detection and error correction. Logical qubits may also be used in other contexts, such as quantum communication.

Figure 7:
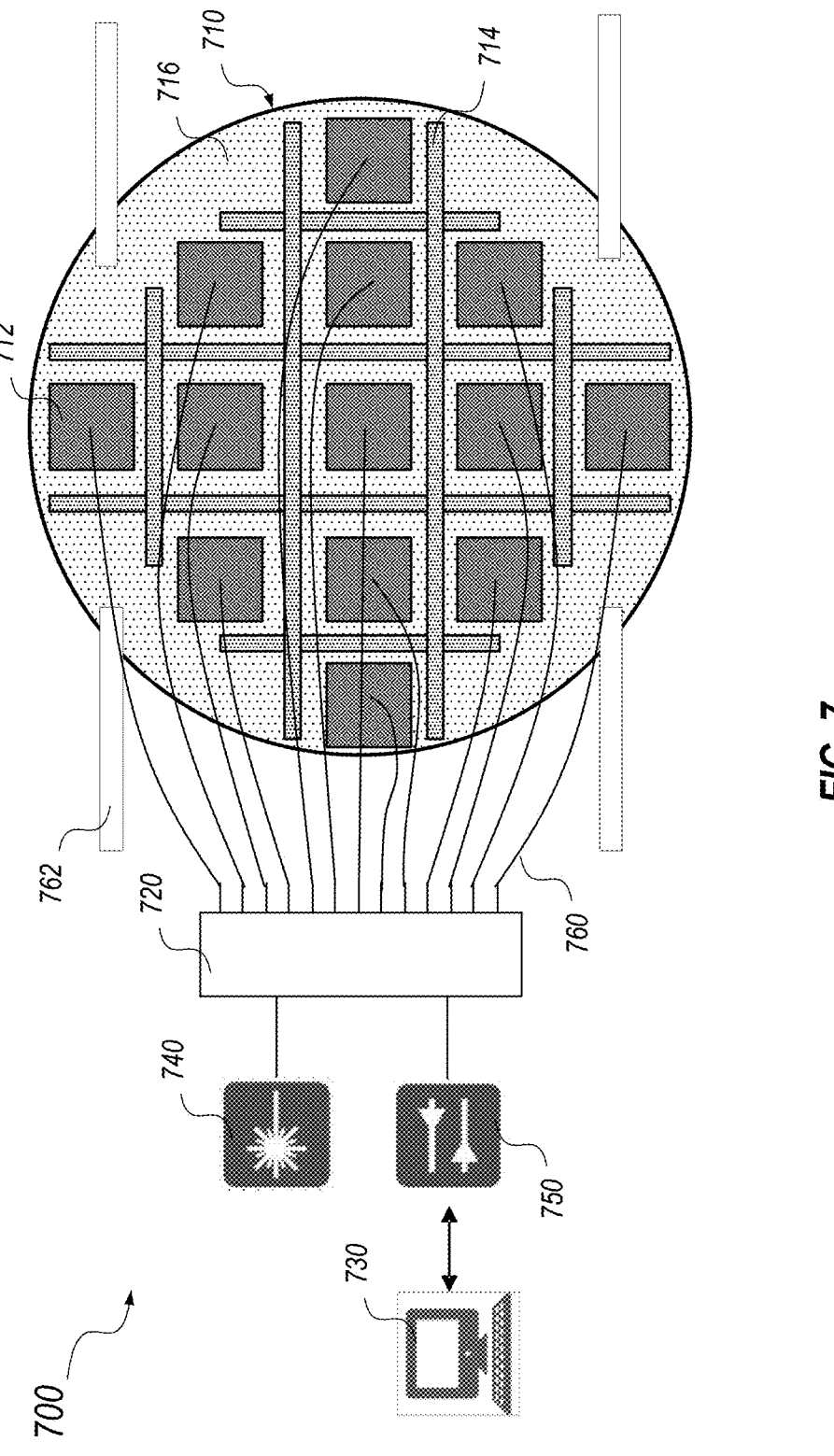
FIG. 7 illustrates an example of a subsystem for generating entangled quantum states (e.g., resource states or logical qubits) according to certain embodiments.

FIG. 7 illustrates an example of a subsystem 700 for generating entangled quantum states (e.g., resource states or logical qubits) according to certain embodiments. Subsystem 700 may include a wafer-scale module 710 that includes multiple EPIC die stacks 712 bonded to an optical backplane 716. EPIC die stacks 712 may be manufactured and bonded to optical backplane 716 as described in details above and below. Wafer-scale module 710 may also include a plurality of PCBs 714 (e.g., an electrical backplane). The EIC dies in EPIC die stacks 712 may be electrically connected to PCBs 714 using, for example, wire bonding. EPIC die stacks 712 may be used to, for example, generate, manipulate, and detect qubits or entangled states of qubits for optical quantum computing or optical quantum communication. For example, EPIC die stacks 712 may include single photon generators, mode couplers, fusion gates, beam splitters, switches, single photon detectors or multi-photon detectors, waveguides, delay lines, modulators, optical switches, ring oscillators, couplers, photodiode-based photodetectors for receiving data and timing signals, and the like, as described above and below. EPIC die stacks 712 may be optically connected together through optical fibers, optical waveguides in optical backplane 716, free-space optical interconnects, and/or other optical interconnects.

Wafer-scale module 710 may be connected to a distribution network 720 through optical fibers 760. Optical fibers 760 may be coupled to EPIC die stacks 712 through grating couplers (or edge couplers) and/or optical backplane 716. Distribution network 720 may be connected to one or more pump laser sources 740 and a control unit 730 (e.g., through an optical transceiver 750). Control unit 730 may include, for example, a classical computing system. In some embodiments, control unit 730 and/or distribution network 720 may be used to control two or more wafer-scale modules 710. Optical fibers 760 may be used to, for example, send pump laser pulses from pump laser sources 740 to EPIC die stacks 712 for single photon generation, send control data from control unit 730 and optical transceiver 750 to EPIC die stacks 712 (e.g., to control the switches), send measurement data from EPIC die stacks 712 to optical transceiver 750 and control unit 730, and the like.

In one example, each EPIC die stack 712 may include a single photon generator that includes waveguides, ring oscillators, interferometers, couplers, optical switches, WDM filters, single photon detectors, and the like that form multiple multiplexed photon pair sources to deterministically generate single photons through a nonlinear optical process (e.g., SFWM, SPDC, second harmonic generation, etc.). In one embodiment, each photon pair source may include a micro-ring based SFWM heralded photon source (HPS), where the detection of one photon of a pair of photons generated during the nonlinear process by a single photon detector (e.g., an SNSPD) may herald the existence of the other photon in the pair that may be used to implement a qubit or generate an entangled resource state. Other classes of photon sources that do not use a nonlinear material may also be employed, such as those that employ atomic and/or artificial atomic systems (e.g., quantum dot sources, color centers in crystals, etc.). The operations of some photon sources may be non-deterministic (also sometimes referred to as "stochastic") such that a given pump pulse may or may not produce a pair of photons. In such photon sources, coherent spatial and/or temporal multiplexing of several non-deterministic photon sources may be performed to increase the probability of having one photon in any given cycle. When the number of multiplexed non-deterministic photon sources is large, the probability of having one photon in any given cycle may be about 100%.

As illustrated in FIG. 7, wafer-scale module 710 may also be coupled to one or more optical fibers 762. The one or more optical fibers 762 may be used to transmit single photons, qubits, or entangled states of qubits between different wafer-scale modules 710 or may be used to loop qubits back to the same wafer-scale module after a delay. As described above and below, in some embodiments, optical fibers 762 may be coupled to waveguides in optical backplane 716 through low-loss couplers. In some embodiments, optical fibers 762 may also be used for data communication, for transmitting pump laser pulses, or as photonic qubit interconnects as described in detail below.

In some embodiments, a quantum computing system may include a plurality of wafer-scale modules and a plurality of optical fibers. Each wafer-scale module of the plurality of wafer-scale modules may include an optical backplane including a substrate and at least one optical waveguide layer on the substrate; and one or more die stacks on the optical backplane. Each die stack of the one or more die stacks may include a photonic integrated circuit (PIC) die optically coupled to the at least one optical waveguide layer of the optical backplane, and an electronic integrated circuit (EIC) die bonded to the PIC die and including an electronic integrated circuit for controlling operations of the PIC die. Each optical fiber of the plurality of optical fibers may be optically coupled to the optical backplanes of two wafer-scale modules of the plurality of wafer-scale modules. In some embodiments, the system may include an optical fiber delay line, where both ends of the optical fiber delay line are connected to the optical backplane of a wafer-scale module of the plurality of wafer-scale modules. The optical fiber delay line may be characterized by a time delay between about 10 ns and about 500 ns.

Figures 8A, 8B:
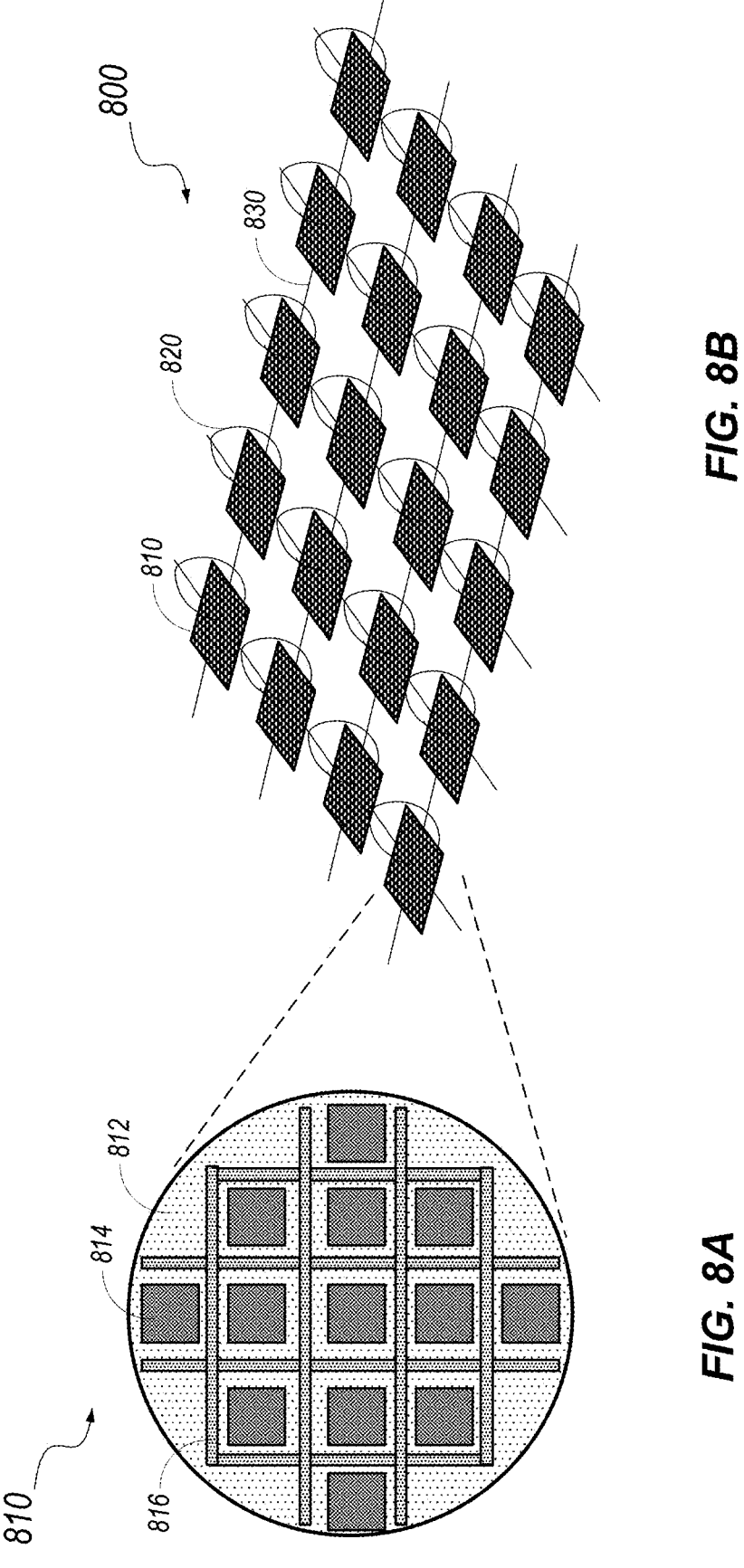
FIG. 8A is a top view of an example of a wafer-scale module including multiple EPIC die stacks on a handle wafer according to certain embodiments.
FIG. 8B illustrates an example of a system including multiple wafer-scale modules interconnected using optical fibers according to certain embodiments.

FIG. 8A is a top view of an example of a wafer-scale module 810 including multiple EPIC die stacks 814 on a handle wafer 812 according to certain embodiments. EPIC die stacks 814 may each include a PIC die and an EIC die, and may be manufactured and bonded to handle wafer 812 (e.g., including an optical backplane or another optical interposer) as described above and below. An EPIC die stack 814 may be optically connected to another EPIC die stack 814 through one or more optical fibers, one or more optical waveguides in the optical interposer, one or more free-space optical interconnects, or other optical interconnects. Wafer-scale module 810 may also include a plurality of PCBs 816. The EIC dies in EPIC die stacks 814 may be electrically connected to PCBs 816 using, for example, wire bonding. EPIC die stacks 814 may be used to, for example, generate, manipulate, and/or detect qubits (e.g., photonic qubits that employ one or more photons) or entangled states of qubits for optical quantum computing.

FIG. 8B illustrates an example of a system 800 including multiple wafer-scale modules 810 interconnected using optical fibers according to certain embodiments. As described above with respect to FIG. 8A, each wafer-scale module 810 may include multiple EPIC die stacks. Optical fibers may be used to provide inter-wafer and/or intra-wafer optical interconnects. For example, optical fibers 820 may be used to connect EPIC die stacks 814 on a same wafer-scale module 810, while optical fibers 830 may be used as interconnects between wafer-scale modules 810. System 800 may be used to perform, for example, qubit generation, manipulation, and/or detection at a larger scale.

Figures 9A, 9B:
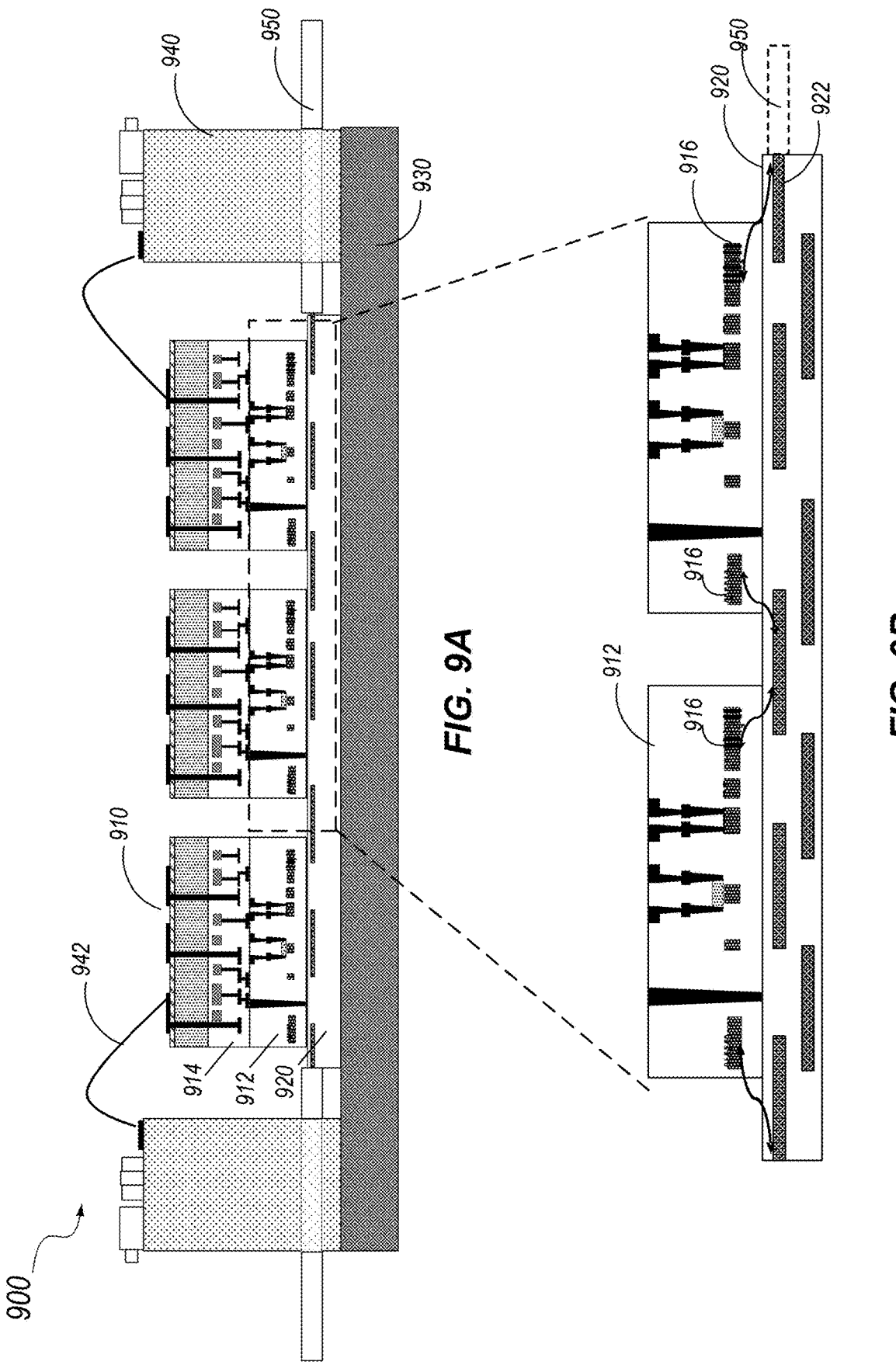
FIG. 9A is a cross-sectional view of an example of a wafer-scale module including multiple EPIC die stacks coupled to an optical backplane according to certain embodiments.
FIG. 9B is a zoom-in view of the example of the wafer-scale module of FIG. 9A according to certain embodiments.

FIG. 9A is a cross-sectional view of an example of a wafer-scale module 900 including multiple EPIC die stacks 910 coupled to an optical backplane 920 according to certain embodiments. Wafer-scale module 900 may be an example of wafer-scale module 710 or 810. FIG. 9B is a zoom-in view of the example of wafer-scale module 900 according to certain embodiments. FIG. 9B shows the optical coupling between PIC dies 912 and optical backplane 920. Optical backplane 920 may be used as an optical interposer for bonding EPIC die stacks 910 to a substrate and for optically connecting EPIC die stacks 910.

Wafer-scale module 900 may be used in, for example, optical quantum computers, communication systems, the qubit converter (encoder/decoder) systems described below, and other electrical-optical hybrid systems. In the illustrated example, wafer-scale module 900 includes a handle wafer 930 (a silicon wafer) with optical backplane 920 formed or bonded thereon. Multiple EPIC die stacks 910 may be bonded to optical backplane 920, for example, through oxide-to-oxide bonding. Each EPIC die stack 910 includes an EIC die 914 and a PIC die 912 bonded together through bonding pads or bonding bumps on the EIC die and the PIC die such that the electrical interconnects between the EIC and the PIC can be short. Electrical backplane devices 940 (e.g., PCBs) may be bonded to handle wafer 930 or optical backplane 920. Electrical backplane devices 940 may be electrically connected to EPIC die stacks 910 through, for example, bonding wires 942. Optical fibers 950 may be coupled to optical backplane 920 through, for example, edge couplers, tapered structures, and/or alignment structures (e.g., V-grooves formed on handle wafer 930).

Wafer-scale module 900 may be used to, for example, generate single photons using a pump laser pulse, waveguides, optical switches, ring oscillators, couplers, wavelength-division multiplexing (WDM) beam splitter, single photon detectors (e.g., for detecting heralding photons), and the like, through a nonlinear process, such as spontaneous parametric down conversion (SPDC) or spontaneous four wave mixing (SFWM). In some embodiments, coherent spatial and/or temporal multiplexing of several non-deterministic photon sources may be performed to increase the probability of generating one photon in a given cycle. Wafer-scale module 900 may also be used to generate resource states or other entangled states of qubits from the single photons using, for example, waveguides, delay lines, couplers, splitters, switches, modulators, fusion gates, and the like.

Wafer-scale module 900 may also be used to detect photons or qubits using, for example, single photon detectors, waveguides, delay lines, and the like. Single photon detectors, such as superconductive nanowire single photon detectors (SNSPDs), may be used to detect a herald photon that signals the generation of a single photon in a single photon generator, or may be used to detect single photons within entangled states (e.g., resource states) in order to detect or perform logical operations on logical quits. In some embodiments, wafer-scale module 900 may include optical isolation structures for scattering mitigation, such that stray light scattered by other circuits in wafer-scale module 900 may not reach the single photon detectors. For example, PIC die 912 may include opaque structures surrounding the single photon detectors to prevent stray light from reaching the single photon detectors. The single photon detectors may also need to operate at very low temperatures, such as cryogenic temperatures. Thus, wafer-scale module 900 may also include cooling structures and thermal isolation structures such that heat generated in other regions would not reach regions that need to operate at low temperatures (e.g., cryogenic temperatures). For example, PIC die 912 may include cooling structures, such as metal conductors or microfluidic channels. In some embodiments, PIC die 912 may also include heating elements. In some embodiments, PIC die 912 may also include thermal isolation structures to isolate photonic circuits that may need to operate at low temperatures or to prevent heat loss of heating elements.

In some embodiments, wafer-scale module 900 may include photodetectors or optical transceivers to receive and/or transmit optical communication signals, such as data and timing signals. In one example, wafer-scale module 900 may include Ge photodiode-based photodetectors for receiving data and timing signals from a control unit. In another example, PIC die 912 and EIC die 914 may include optical transceivers for communicating with, for example, a control unit. In some embodiments, PIC die 912 and EIC die 914 may include optical modulators.

FIG. 9B shows the optical coupling between PIC dies 912 and optical backplane 920. Optical backplane 920 may include one or more waveguide layers that include multiple waveguides 922. In some embodiments, one waveguide layer may include routing waveguides for optically connecting PIC dies 912 and another waveguide layer may include waveguide delay lines. Light from an optical fiber 950 or a PIC die 912 may be coupled into a waveguide 922. The light may propagate in waveguide 922 and may be coupled into PIC dies 912 by a waveguide coupler 916. In some embodiments, the light signals may also be coupled into waveguides in different waveguide layers in optical backplane 920. In some embodiments, light may also be coupled from a PIC die 912 to a waveguide 922 in optical backplane 920 by a waveguide coupler 916, and may then be coupled from waveguide 922 to another PIC die 912 by another waveguide coupler 916. Thus, waveguides 922 may be used for light signal routing, layer-to-layer transition, and the like.

Figure 10:
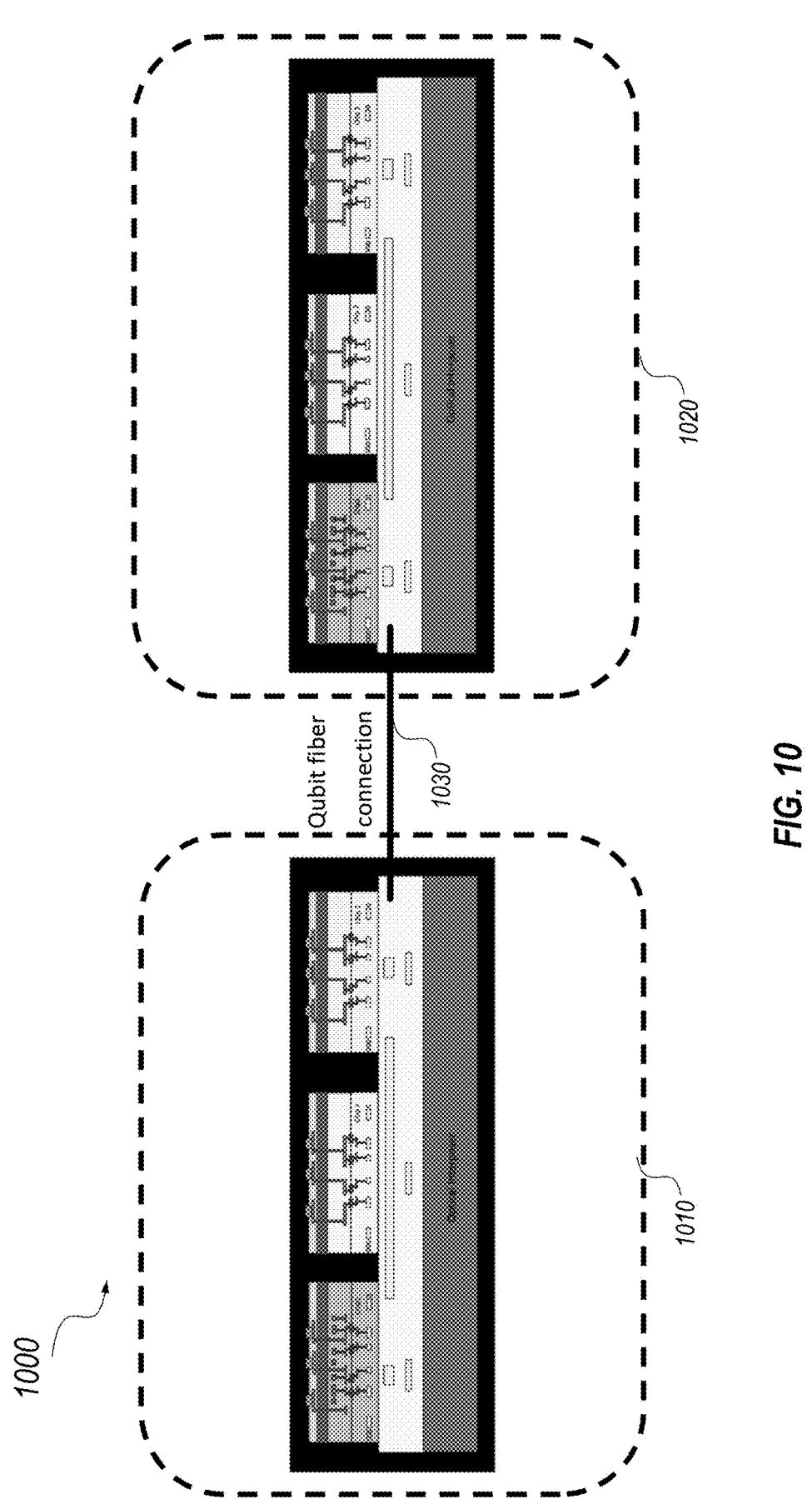
FIG. 10 shows an example of a system including optical fibers for transmitting, delaying, or storing single photons, qubits, qudits, resource states, or other entangled states.

FIG. 10 shows an example of a system 1000 including optical fibers for transmitting, delaying, or storing single photons, qubits, qudits, resource states, or other entangled states. In the illustrated example, system 1000 may include a first wafer-scale module 1010, a second wafer-scale module 1020, and optical fibers 1030 for qubit connection between first wafer-scale module 1010 and second wafer-scale module 1020. When the qubits are implemented using, for example, dual rails as shown in FIG. 1, pairs of optical fibers may need to be used to transmit qubits between the wafer-scale modules. When pairs of optical fibers are used, the fibers in each pair may experience different environments, such as different temperatures, different stresses, and different coupling conditions, and thus there may be different delays or phase changes for photons propagating on different optical fibers.

Figure 11A:
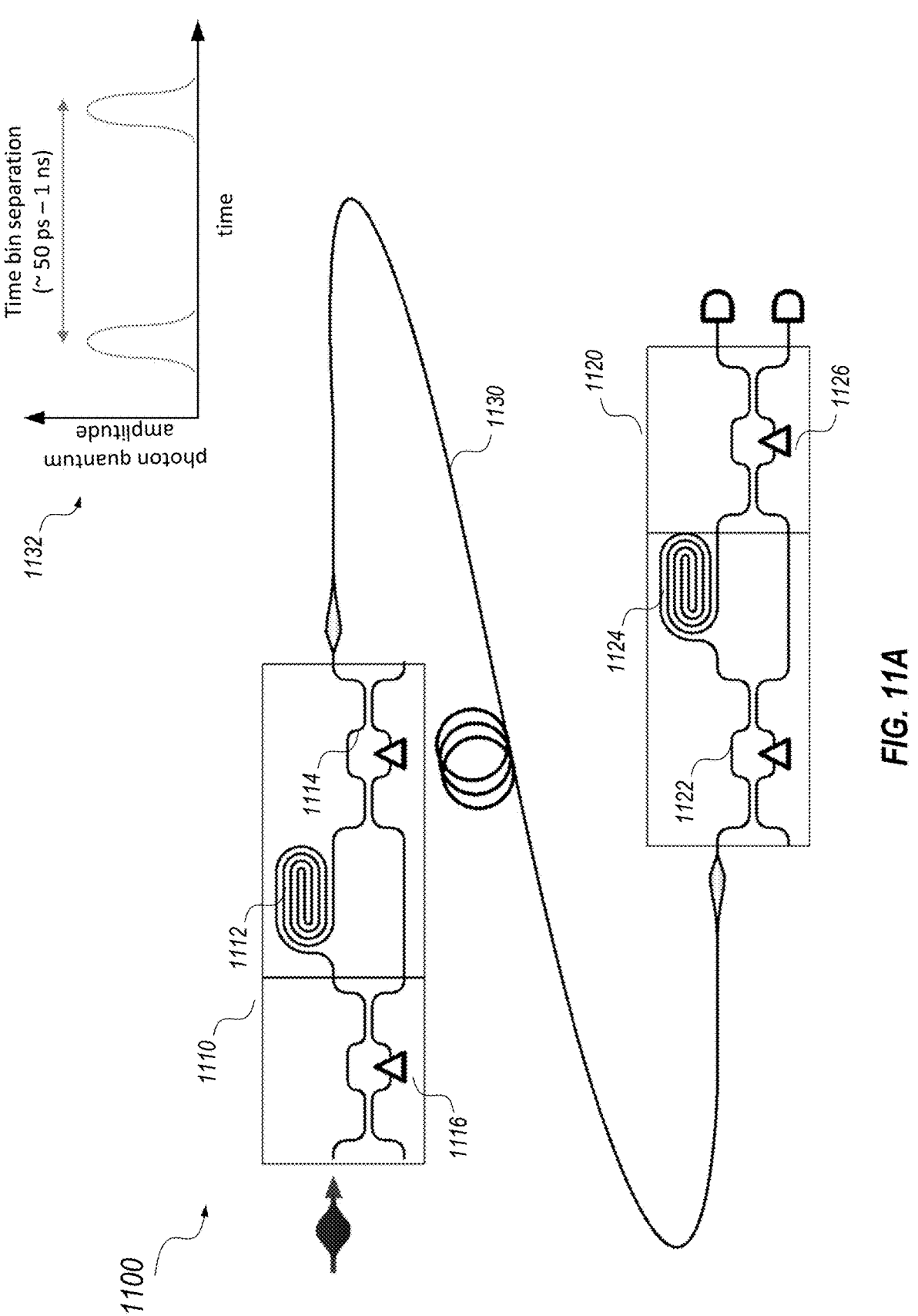
FIG. 11A illustrates an example of a system including a first chip, a second chip, and an optical fiber for transmitting qubits between the first chip and second chip according to certain embodiments.

According to certain embodiments, on a transmitter side, spatial-mode qubits (e.g., dual-rail encoded photonic qubits) may be converted to temporal-mode qubits (e.g., time bin encoded photonic qubits, e.g., time bin encoded qubit 1132 shown in FIG. 11A) using a qubit converter that includes a delay line, e.g., a waveguide delay line, and a switch controlled by a clock signal. In this way, the qubits may be transmitted on a same optical fiber and thus may experience the same environment on the propagation path. In some embodiments, on the receiver side, the received temporal-mode qubits may be converted to spatial-mode qubits using a qubit converter that includes a delay line and a switch controlled by a clock signal.

FIG. 11A illustrates an example of a system 1100 including a first photonic integrated circuit 1110 (e.g., photonic entangled state encoder, qubit encoder), a second photonic integrated circuit 1120 (e.g., photonic entangle state decoder, qubit decoder), and an optical interconnect 1130 (e.g., fiber, waveguide in an optical transposer that connects the first photonic integrated circuit 1110 and the second photonic integrated circuit 1120) for transmitting entangled photonic states (e.g., photonic qubits) between first photonic integrated circuit 1110 and second photonic integrated circuit 1120, according to certain embodiments. The first photonic integrated circuit 1110 and second photonic integrated circuit 1120 may be chip-scale or wafer-scale modules as described above. In some example embodiments, the first photonic integrated circuit 1110 and the second photonic integrated circuit 1120 comprise the same components and layout but with the inputs and outputs reversed for the second photonic integrated circuit 1120 such that the first photonic integrated circuit 1110 operates as a qubit encoder to convert photonic qubits from spatial format to temporal format, and the second photonic integrated circuit 1120 operates as a qubit decoder to convert the received photonic qubits from the temporal format to the spatial format.

In the illustrated example, first photonic integrated circuit 1110 may include a qubit preparation circuit (e.g., state preparation unit 1116). The first photonic integrated circuit may further comprise a qubit encoder section that includes: a pair of waveguides, a delay line 1112 in one of the waveguides, and a switch 1114 (e.g., MZI comprising one or more phase shifters—triangles in FIG. 11A—on one of the arms of the MZI). The second photonic integrated circuit 1120 may include a qubit decoder section including a switch 1122, and a pair of waveguides that include a delay line 1124 on one of the waveguide arms. The second photonic integrated circuit 1120 may further include a qubit projection circuit 1126 (e.g., state preparation photonic circuit with inputs and outputs flipped) that output to detectors (e.g., to perform tomography). The first photonic integrated circuit 1110 and second photonic integrated circuit 1120 may be synchronized with each other and with the incoming photonic entangled states, such as photonic qubits, portions of photonic resource states, qubit portions of photonic cluster states.

Delay line 1112 or 1124 may have a delay, for example, of about 25 ps to about 500 ps, for a time bin separation of about 50 ps to about 1 ns for the qubits. Delay line 1112 or 1124 may include a waveguide made of silicon nitride, lithium niobate, silicon, or other materials that may provide a low loss (e.g., <about 50 mdB/m). Delay lines 1112 and 1124 may be formed on the photonic chips or may be formed on an interposer, as described above. The switches 1114 and 1122 may each include, for example, a Mach-Zehnder interferometer (MZI) that may include a tunable phase shifter made with, for example, barium titanate (BTO), or any other suitable electro-optic material such as lithium niobate, and the like. The switching time of switches 1114 and 1122 may need to be much shorter than the time bin separation described above. Switches 1114 and 1122 may be controlled by synchronous or asynchronous control signals. For example, switches 1114 and 1122 may be controlled by a periodic clock signal to switch at a constant switching rate, or may be controlled by a feedforward signal that may only be asserted when a photon or a qubit is generated or detected.

In some example embodiments, the first photonic integrated circuit 1110 is tuned with the second photonic integrated circuit 1120 in a calibration phase to compensate for variations that may occur between the components of the first photonic integrated circuit 1110 and the second photonic integrated circuit 1120). For example, the delay line 1112 and the delay line 1124 may have manufacturing variations that cause non-identical amounts of delay. In some example embodiments, one or more phase shifters in the first photonic integrated circuit 1110 or the second photonic integrated circuit 1120 are adjusted during a calibration stage (e.g., using bright light, optical pulses) to ensure any phase or delay differences between the delay line 1112 and the delay line 1124 are minimized or removed such that both the delay line 1112 and the delay line 1124 apply the same amount of delay thereby ensuring high performance space-to-time encoding and time-to-space decoding. In some example embodiments, the switch 1114 comprises multiple phase shifters, where one of the phase shifters is a "slow" phase shifter (e.g., heater, a second triangle in the switch 1114 that is not depicted in FIG. 11A) that is used during calibration for equalization between the first photonic integrated circuit 1110 and the second photonic integrated circuit 1120. For instance, the slow phase shifter can be adjusted to apply a phase offset to compensate for variations between the first photonic integrated circuit 1110 and the second photonic integrated circuit 1120. After adjustment of the slow phase shifter, another phase shifter in the switch 1114 (e.g., the triangle depicted in switch 1114) operates as a high-speed fast phase shifter to perform high speed switching within the range of the delay time of the delay line 1112 (e.g., 500 picoseconds). In some example embodiments, the switch 1122 in the second photonic integrated circuit 1120 also has one or more additional phase shifters to compensate for the delays or variations between the first photonic integrated circuit 1110 and the second photonic integrated circuit 1120. In some example embodiments, a phase shifter can be placed outside the switch (e.g., switch 1114, switch 1122) to perform compensation and equalization between the PICs. For example, an additional phase shifter may be placed between the state preparation unit 1116 and the switch 1114 (e.g., on a bottom arm, where the top arm comprises the delay line 1112), where the additional phase shifter is implemented during calibration to add phase to equalize the paths in the first photonic integrated circuit 1110 and the second photonic integrated circuit 1120.

In some example embodiments, the propagation of the light through the delay components, e.g., delay line 1112) in the PICs impart additional optical loss on light propagating in PIC. For example, in the first photonic integrated circuit 1110, light that traverses the delay line 1112 will incur more loss than light that traverses the bottom arm. For instance, if the state preparation unit is configured as a 50:50 beam splitter, the light directed to the top arm to the delay line 1112 exhibits higher attenuation than light in the bottom arm. In some example embodiments, the second photonic integrated circuit 1120 configured to ensure that light that traverses the delay line 1112 in the top arm of the first photonic integrated circuit 1110 will traverse the bottom arm in the second photonic integrated circuit 1124 and thereby avoid the delay line 1124. Further, the light that traverses the non-delay bottom arm in the first photonic integrated circuit 1110, which does not undergo as much loss as the top arm with the delay, is directed to the top arm of the second photonic integrated circuit 1120 to traverse the delay line 1124 and incur loss, such that the outputs of decoder (e.g., to the detectors) is balanced and has a similar or identical optical power. It is appreciated that in the above, directing the light to the delay or non-delay arm of the encoder and decoder PICs can be performed using bright light, and once configured, quantum light (e.g., photonic qubits) are implemented in the first photonic integrated circuit 1110 and the second photonic integrated circuit 1120.

Figure 11B:
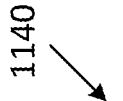
FIG. 11B shows a flow diagram of a method of transmitting qubits, according to certain embodiments.
Figure 11B:
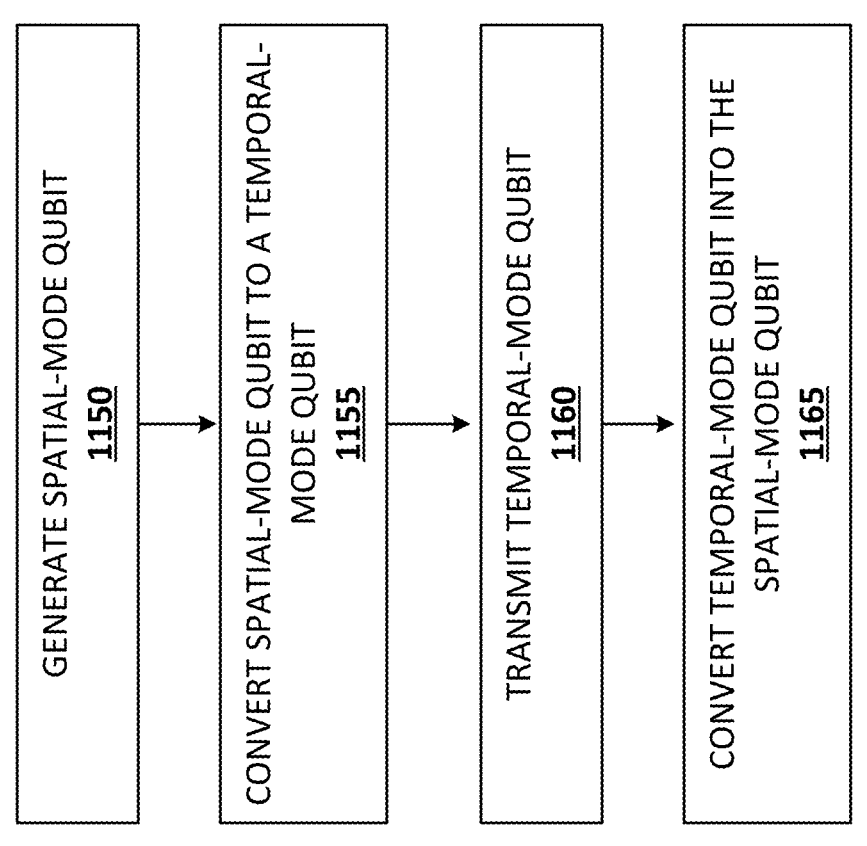

FIG. 11B is a flowchart of an example process 1140, in accordance with some example embodiments. In some implementations, one or more process blocks of FIG. 11B may be performed by a first photonic integrated circuit and a second photonic integrated circuit. As shown in FIG. 11B, process 1140 may include generating a spatial-mode qubit using a qubit source (block 1150). For example, a first photonic integrated circuit may generate a spatial-mode qubit using a qubit source, as described above. As also shown in FIG. 11B, process 1140 may include converting the spatial-mode qubit to a temporal-mode qubit using an optical delay and a switch of a first photonic integrated circuit (block 1155). For example, the first photonic integrated circuit may convert the spatial-mode qubit to a temporal-mode qubit using an optical delay and a switch of a first photonic integrated circuit, as described above. As further shown in FIG. 11B, process 1140 may include transmitting, on an optical interconnect, the temporal-mode qubit from the first photonic integrated circuit to a second photonic integrated circuit, where the optical interconnect is a fiber or waveguide that couples together the first photonic integrated circuit and the second photonic integrated circuit (block 1160). As also shown in FIG. 11B, process 1140 may include converting, on the second photonic integrated circuit, the temporal-mode qubit back into the spatial-mode qubit (block 1165). For example, the second photonic integrated circuit may convert the temporal-mode qubit back into the spatial-mode qubit, as described above.

Although FIG. 11B shows example blocks of process 1140, in some implementations, process 1140 may include additional blocks, fewer blocks, different blocks, or differently arranged blocks than those depicted in FIG. 11B. Additionally, or alternatively, two or more of the blocks of process 1140 may be performed in parallel.

Figure 12:
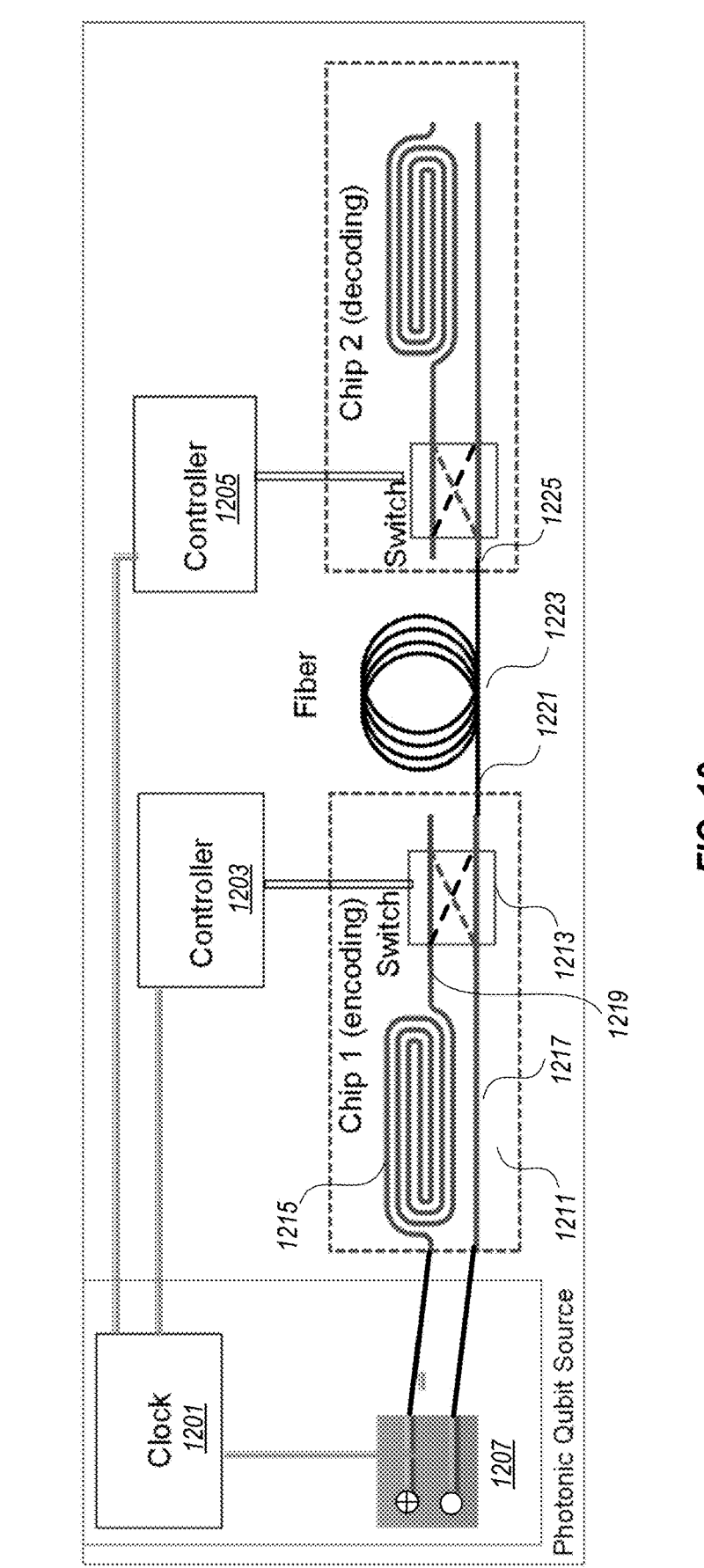
FIG. 12 illustrates an example of a system according to certain embodiments.

FIG. 12 illustrates an example of a system 1200 according to certain embodiments. System 1200 may be an example of system 1100. System 1200 may include a clock circuit 1201 that may provide timing signals (e.g., clock signals) to controllers, such as a controller 1203 for chip 1 and a controller 1205 for chip 2. In some embodiments, the clock signal may be an optical clock signal. As described above, in some embodiments, the clock signal may be derived from the photonic qubit source 1207, such as the single photon generators shown in FIGS. 1-6. The photon qubit source 1207 may be integrated on chip 1 or may be on a different chip. A qubit generation circuit, such as that shown in FIG. 11A may be on the same chip (e.g., chip 1) as the qubit converter circuit or on a different chip. In the illustrated example, the qubit converter circuit may be a photonic integrated circuit and include a waveguide delay line 1215 on one rail 1219 (e.g., waveguide) of a dual-rail qubit bus (including a pair of waveguides) 1211, and a switch 1213 that is controlled by controller 1203 to connect each of the two rails (at different times based on the state of the switch) to an output waveguide 1221 of the photonic integrated circuit. For example, the switch may be turned off during a first time period (e.g., a first half of a clock period) such that the output portion of bottom rail 1217 of the dual-rail qubit bus may be connected to output waveguide 1221 in the first time period. The switch may be turned on during a second time period (e.g., a second half of the clock period) such that the output portion of top rail 1219 of the dual-rail qubit bus (where the photons may be delayed for a half clock period) may be connected to the output waveguide 1221 in the second time period. Therefore, on the output waveguide 1221, the qubits may be temporally encoded, where the different quantum states of the qubit may be represented by a photon in the first half of the clock period or in the second half of the clock period. Such a temporal encoding is advantageous for transmitting the qubit across long distances, e.g., through optical fiber 1223.

On chip 2, the switch may similarly be controlled by controller 1205 to selectively connect the input waveguide 1225 to the two rails of the dual-rail qubit bus. In the illustrated example, in the first half of a clock period, the switch may be turned on to connect the optical fiber to the top rail that may include an on-chip integrated delay line, to send any incoming photon in the first half of the clock period to the top rail and the delay line. In the second half of the clock period, the switch may be turned off, such that the optical fiber may be connected to the bottom rail that does not include the additional delay line, such that any incoming photon during the second half of the clock period may be sent to the bottom rail. As such, after passing the delay line, a photon that may be received earlier (in the first half of the clock period) by chip 2 may be delayed (e.g., by a half clock period) by the delay line, such that it may spatially align with a photon received later (e.g., in the second half of the clock period) by chip 2.

Figures 13A, 13B:
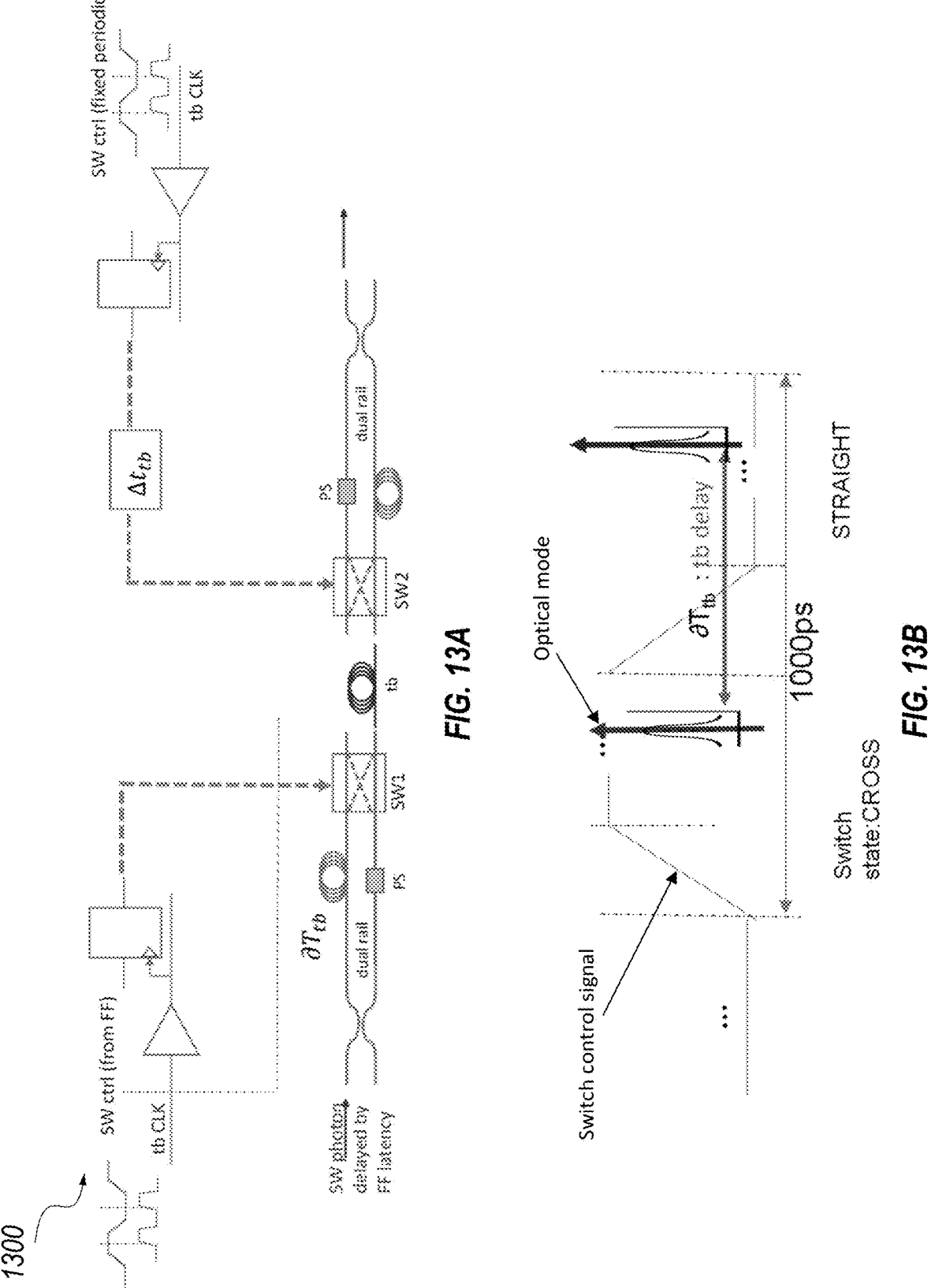
FIG. 13A shows an example of a system and examples of control signals for controlling the operation of the system according to certain embodiments.
FIG. 13B shows the relationship between the control signals of FIG. 13A.

FIG. 13A shows an example of a system 1300 and examples of control signals for controlling the operation of system 1300 according to certain embodiments. FIG. 13B shows the relationship between some control signals. System 1300 may be an example of system 1200. In the illustrated example, switch 1 (SW 1) on the first chip may be controlled by a control circuit that is controlled by a clock signal (tb CLK) and a switch control signal (SW ctrl). In the illustrate example, the switch control signal may be a feedforward signal from the photon source (e.g., from a herald photon detector) and thus may only be asserted when a photon is generated and detected. In this way, the switch may only be switched if there is a valid qubit, and thus may reduce the power consumption. Switch 2 (SW 1) on the second chip may be controlled by a control circuit that is controlled by a clock signal (tb CLK) and a switch control signal, which may be a periodic clock signal and may be from the photon source (e.g., generated using the excess pump photons as described above with respect to FIG. 5). In some embodiments where the feedforward signal may be passed onto the second chip, the feedforward signal may be used as the switch control signal for the control circuit of switch 2. Thus, the switch control signals may be synchronized with and have the same frequency as the pump pulses or the control clock of the photon pump source (e.g., with a clock period about 1 ns or a pulse repetition rate about 1 GHz). In some embodiments, the qubits from the qubit generator may need to be delayed by the feedforward signal latency to center the optical modes (quantum modes) in the middle of each switch state, such that the switch may be in a stable state (rather than a transition period) when the photons or optical modes reach the switch.

As illustrated in FIGS. 13A and 13B, the tb CLK may have a period about a half of the switch control signal or shorter (or a frequency about twice or more of the frequency of the switch control signal). The delay line in one rail of the dual-rail qubit bus may have a time delay STtb about a period of the tb CLK or a half of the period of the switch control signal, such that the optical modes of a qubit may be temporally shift by a period of the tb CLK. In some embodiments, the time delay STtb may be shorter than the period of the tb CLK or a half of the period of the switch control signal. In some embodiments, a delay $\Delta t_{tb}$ may be added to the control signal for controlling switch 1 or switch 2 to compensate for the interconnect delay of the control signal. In some embodiments, the qubits from the qubit generator may need to be delayed by the feedforward signal latency in order to center the optical modes in the middle of each switch state, such that the switch may be in a stable state (rather than a transition period) when the photons or optical modes reach the switch. For example, as shown in FIG. 13B, an optical mode may be aligned with the center of the high state of the switch control signal, where the switch may be turned on so that the switch is in the "CROSS" state, and another optical mode may be aligned with the center of the low state of the switch control signal, where the switch may be turned off so that the switch is in the "STRAIGHT" or "THROUGH" state.

Figure 14:
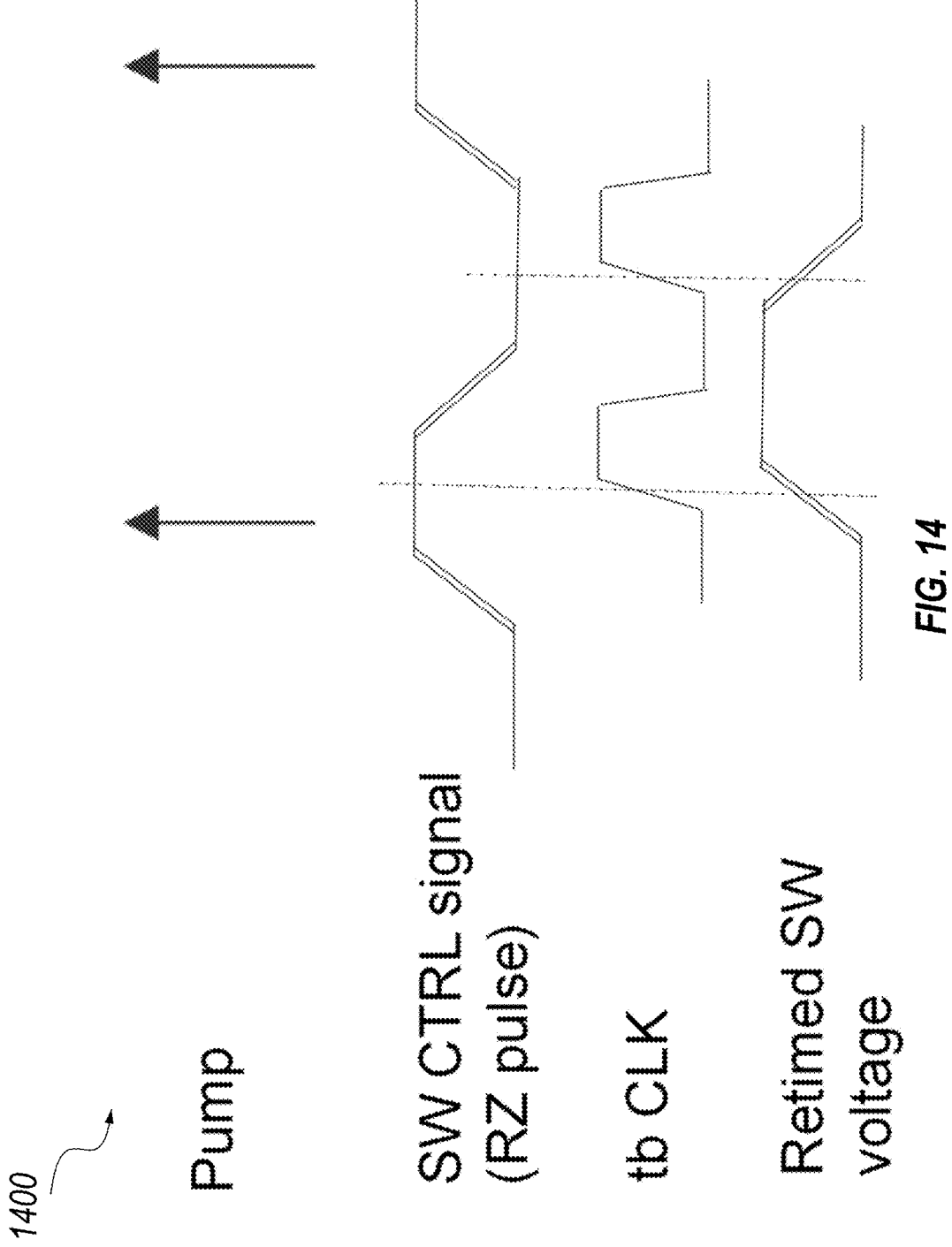
FIG. 14 shows examples of the timing of some control signals of FIGS. 13A and 13B according to certain embodiments.

FIG. 14 includes a diagram 1400 showing examples of the timing of some control signals of FIGS. 13A and 13B according to certain embodiments. FIG. 14 shows that the switch control signal may have an return-to-zero (RZ) format and may have a same frequency as the pump pulses (e.g., synchronized with the pump pulses). The tb CLK may have a frequency that is about twice of the frequency of the switch control signal, where the rising edges of the tb CLK may be aligned with the centers of the high/low states of the switch control signal. The retimed switch voltage signal may have rising/falling edges aligned with the rising edges of the tb CLK.

Figure 15H:
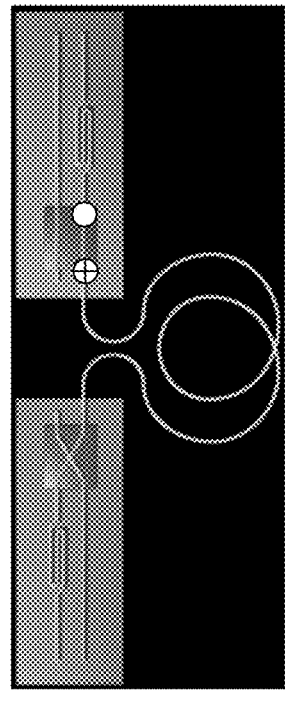

FIGS. 15A-15L show an example of the propagation of the optical modes (indicated by yellow and red dots) in a system that includes qubit converters according to certain embodiments. FIGS. 15A-15L show the positions of the optical modes at different time instants. For example, in FIG. 15A, the two optical modes of a qubit may be at a photon qubit source. FIG. 15B shows that the optical modes may enter a dual-rail qubit bus and may be aligned temporally and spatially. FIG. 15C shows that the optical mode in the top rail may be delayed such that, when the optical mode in the bottom rail reaches the switch, the optical mode in the top rail is not at the switch yet. The switch may be turned off (in a "STRAIGHT" or "THROUGH" state), and thus the optical mode in the bottom rail may pass through the switch and enter an optical fiber. FIG. 15D shows that, after the optical mode in the bottom rail passes through the switch (and enters an optical fiber), the switch may be turned on (in the "CROSS" state), and thus the optical mode in the top rail may cross the switch and enter the optical fiber at a later time. FIGS. 15E and 15F show that, in the optical fiber, the spatial dual-rail qubit may become a temporal single-rail qubit (temporal-mode qubit), where one optical mode may be after another optical mode of the qubit.

Figure 15J:
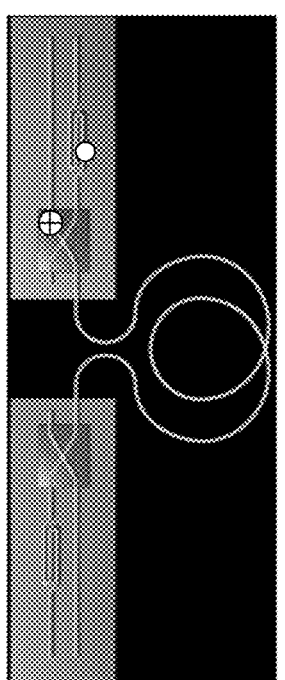
Figure 15L:
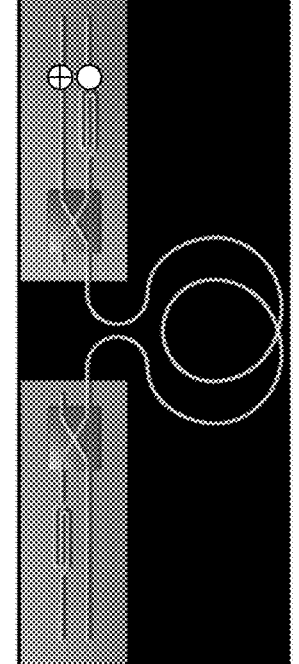
Figure 15G:
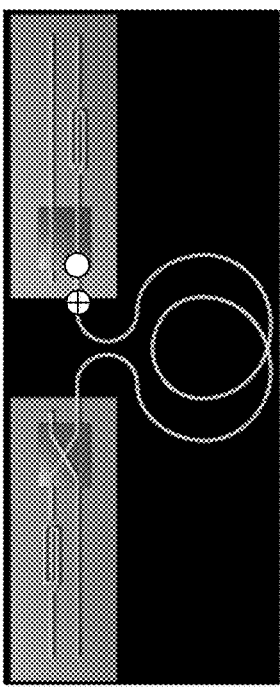
Figure 15I:
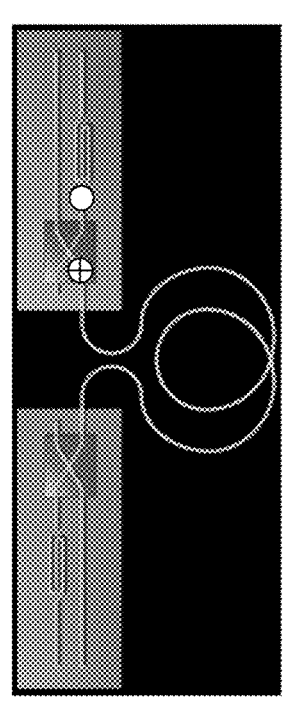
Figure 15K:
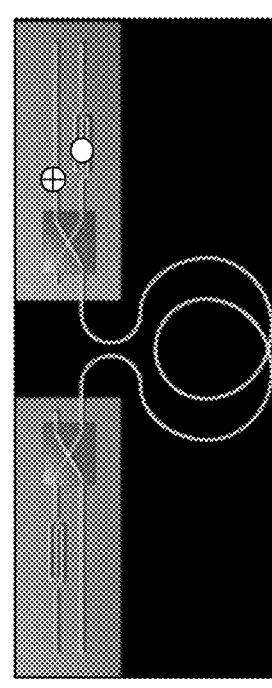

FIG. 15G shows that a first optical mode of the temporal-mode qubit may reach the switch on a second chip, while the second optical mode of the temporal-mode qubit may still be in the optical fiber. FIG. 15H shows that the switch in the second chip may be turned off (in a "STRAIGHT" or "THROUGH" state), and thus the first optical mode may pass through the switch and enter the bottom rail of a dual-rail qubit bus on the second chip. FIG. 15I shows that, after the first optical mode passes through the switch, the switch may be turned on and may be in a stable "CROSS" state when the second optical mode arrives. Therefore, the second optical mode may be sent by the switch to the top rail of the dual-rail qubit bus on the second chip as shown in FIG. 15J. FIG. 15K shows that, while the second optical mode propagates in the top rail, the first optical mode in the bottom rail may be delayed by a delay line. FIG. 15L shows that, after the first optical mode in the bottom rail passes through the delay line, the first optical mode and the second optical mode may be aligned spatially and temporally.

FIGS. 16A-16D show various structures of MZIs that may be used as the switches in the qubit converters disclosed herein according to certain embodiments. Each MZI may include two 50/50 splitters/combiners, and two arms made of optical waveguides. The phase shift in an arm of the MZI may be achieved by applying an electric field through an electro-optic material that affects the optical mode propagating in the waveguide. The electrode can be designed as travelling wave electrodes and may be terminated. In the example shown in FIG. 16A, a voltage signal may be applied to one arm of the MZI to tune the phase delay on one arm. In the example shown in FIG. 16B, a common VDD may be applied in the middle of the two arms, and opposite voltage signals may be applied to both arms of the MZI to tune the phase delays on both waveguides, such that the electric field may be increased in one arm and may be decreased in the other arm, thereby changing the phase in both arms at the same time. The voltage across each arm only needs to shift 90°. In the example shown in FIG. 16C, the common VDD may be on opposite sides of the MZI, and the opposite voltage signals may be applied to the arms of the MZI from the center of the two arms. In the example shown in FIG. 16D, a VDD signal may be applied from one side of the MZI, and the ground may be at the opposite side of the MZI. A common signal may be applied to the center of the two arms.

Figure 17:
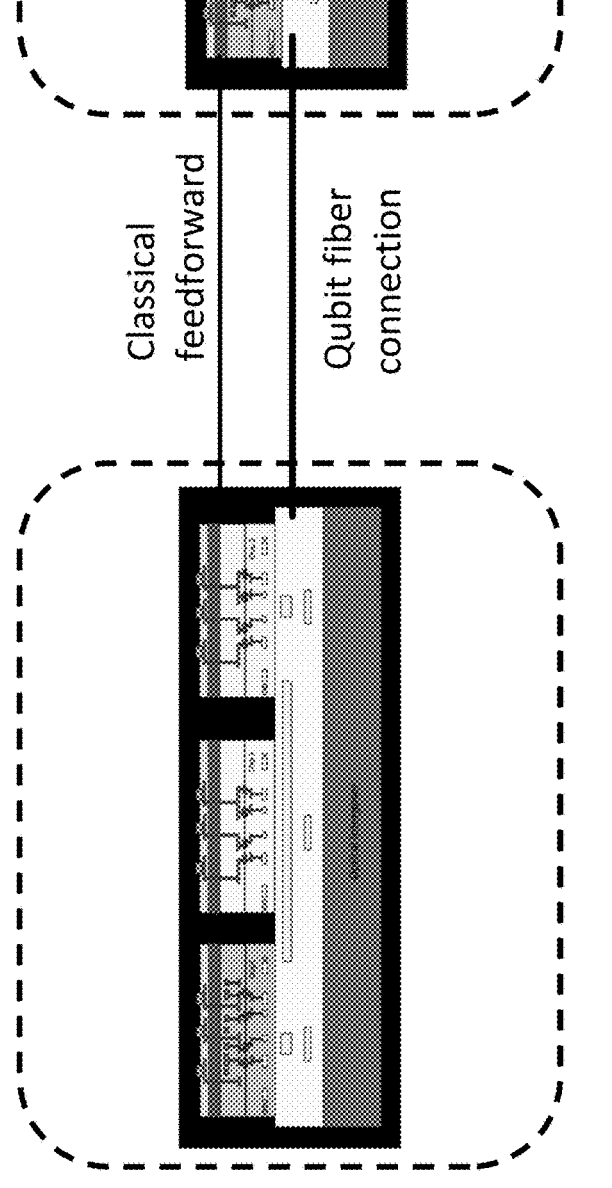
FIG. 17 shows an example of a system where the feedforward signal generated on a first chip may be sent to a second chip.

FIG. 17 shows an example of a system 1700 where the feedforward signal generated on the first chip may be sent to the second chip. As described above, the feedforward signal may be used to control the switch of the qubit decoder on the second chip, for example, to reduce power consumption. The feedforward signal may be sent optically or electrically.

Figure 18:
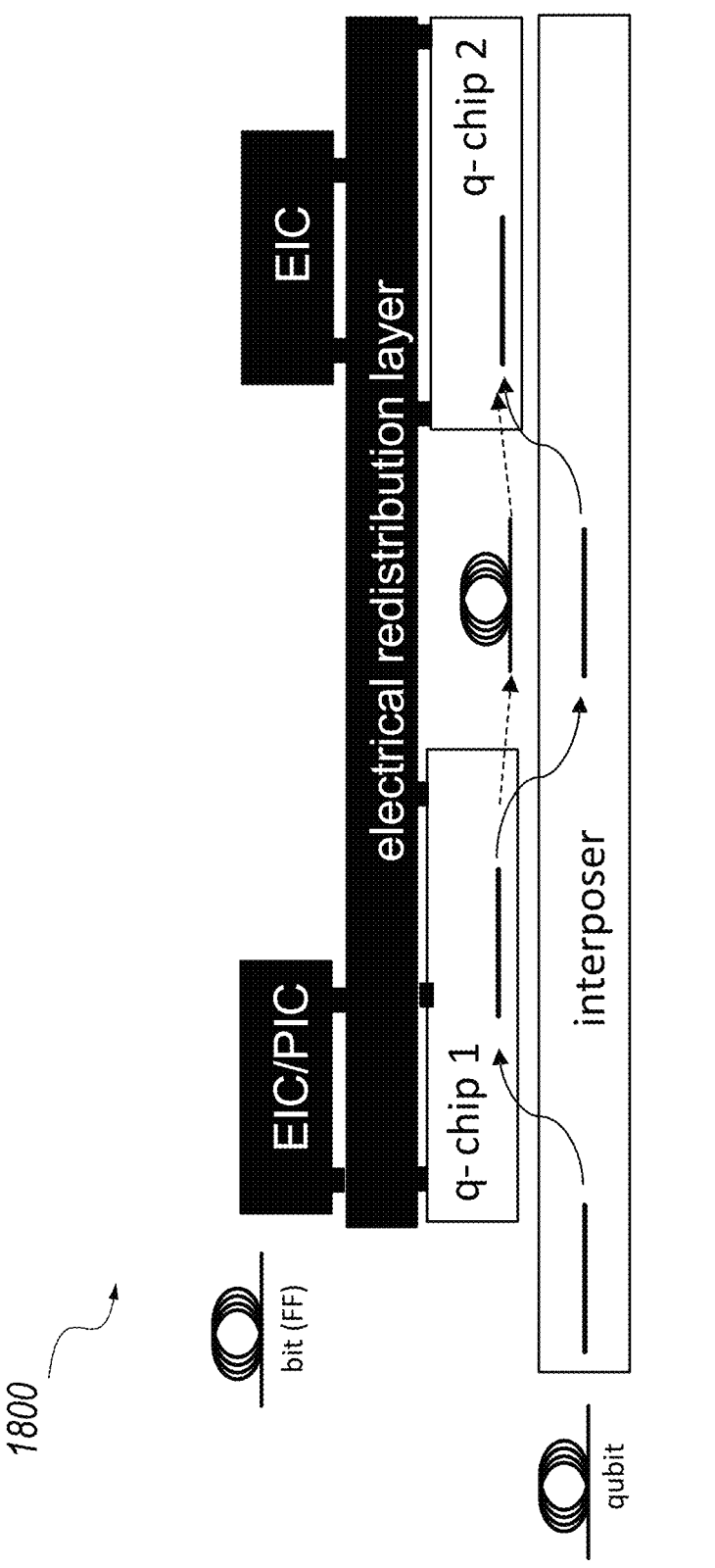
FIG. 18 shows an example of a system where optical signals (e.g., qubits and/or feedforward optical signals) may be transmitted between photonic chips using waveguides in an optical interposer, optical fibers, and/or free-space optical interconnects.

FIG. 18 shows an example of a system 1800 where optical signals (e.g., qubits and/or feedforward optical signals) may be transmitted between photonic chips using waveguides in an optical interposer, optical fibers, and/or free-space optical interconnects. For example, the feedforward signals may be converted to optical signals using a modulator on a first photonic chip, sent through optical fibers or free-space optical interconnects, and received by a photodetector on a second photonic chip. Electrical signals may be transmitted between EIC/PIC die stacks using an electrical redistribution layer that may be bonded to the EIC/PIC die stacks. For example, the clock signals or other control signals (e.g., the feedforward signal) may be transmitted through the electrical redistribution layer.

Figure 19:
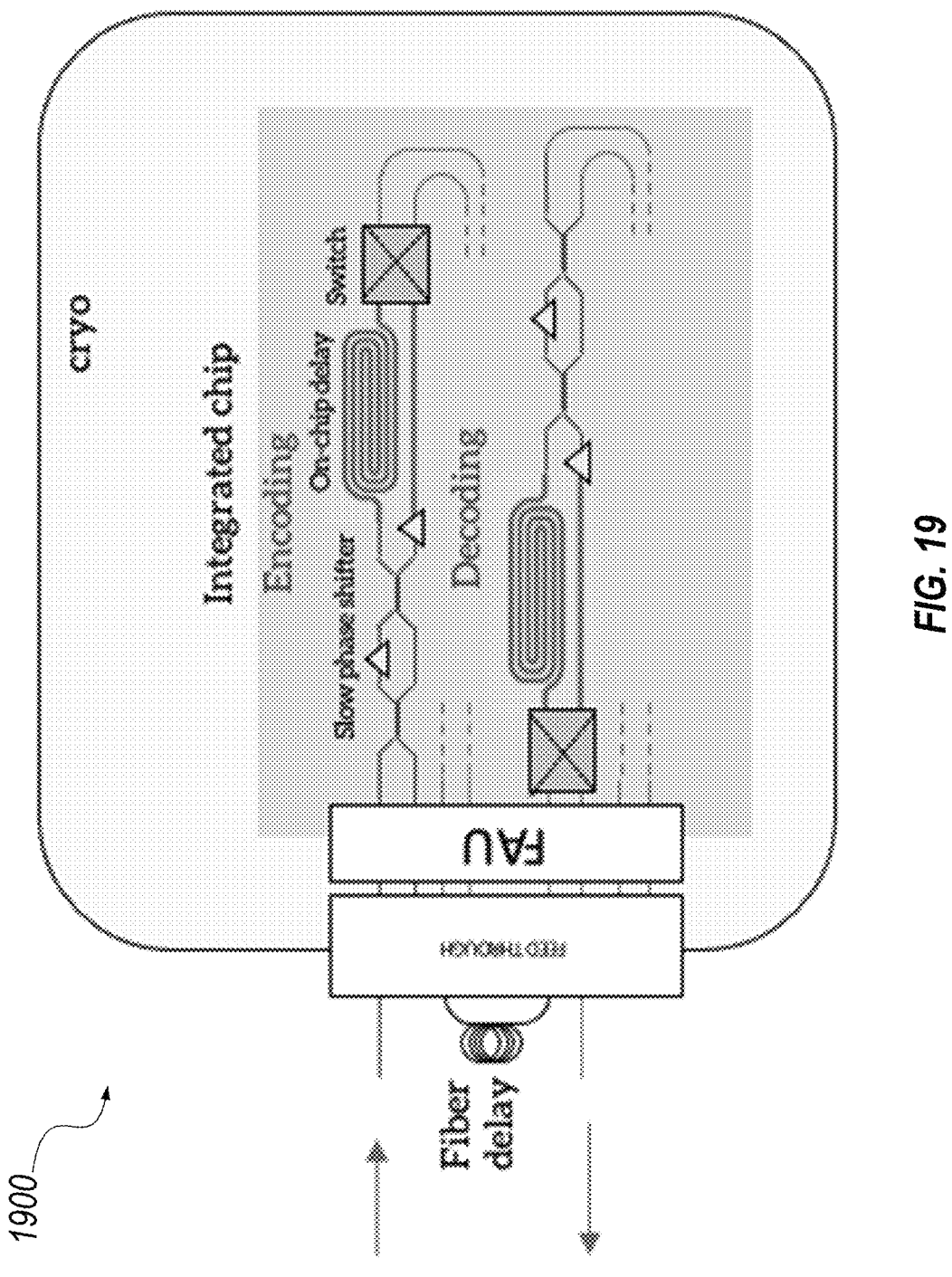
FIG. 19 illustrates an example of an integrated circuit chip that includes a qubit encoder and a qubit decoder connected through optical fiber delay lines according to certain embodiments.

FIG. 19 illustrates an example of an integrated chip 1900 that includes a qubit encoder and a qubit decoder connected through optical fiber delay lines that are connect to integrated chip 1900 through a Fiber Array Unit (FAU). In the illustrated example, photons may be received at integrated chip 1900 and may be used to generate qubits. The qubits in spatial mode may be converted to qubits in temporal mode by the qubit encoding circuit, and the qubits in temporal mode may be sent through the FAU to the optical fiber delay lines. The delayed qubits in temporal mode may be sent to the qubit decoding circuit, and may be converted back to the spatial mode as described above.

Figure 20:
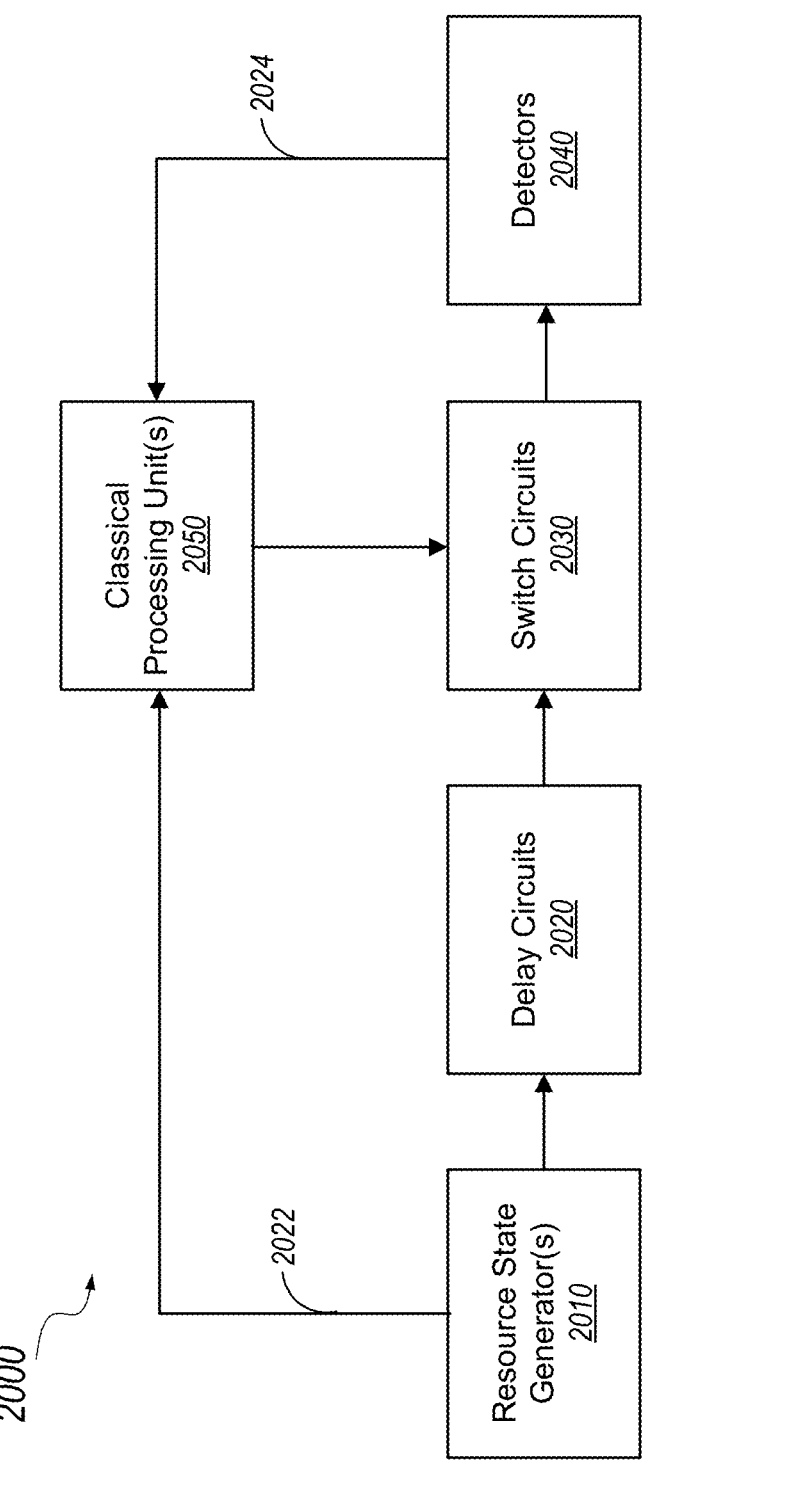
FIG. 20 includes a simplified block diagram of an example of a quantum computing system according to some embodiments.

FIG. 20 is a simplified block diagram of an example of a quantum computing system 2000 according to some embodiments. Quantum computing system 2000 may implement, for example, measurement-based quantum computing (MBQC) or fusion-based quantum computing (FBQC). Some embodiments of quantum computing system 2000 may use photonic physical qubits to generate a fault-tolerant cluster state that can be used to represent logical qubits for MBQC, while other embodiments of quantum computing system 2000 may generate measurement data reflecting entanglement structures for fault-tolerant FBQC. In the illustrated example, quantum computing system 2000 may include resource state generator(s) 2010, delay circuits 2020, switch circuits 2030, detectors 2040, and one or more classical processing units 2050.

Resource state generators 2010 may include one or more resource state generators (RSGs). The RSGs may autonomously operate, with no data input needed. Each RSG may generate one resource state per clock cycle (which can be, e.g., shorter than about 1ns, about 1 ns, or longer than about 1 ns). Each resource state may include multiple (e.g., 7 or 9) entangled physical qubits. The resource state can be output to delay circuits 2020 at a rate of, for example, about n*N photons per clock cycle, where n is the number of qubits in each resource state and N is the number of RSGs. Resource state generators 2010 can also send classical data output (e.g., indicating success or failure of various elements of the resource state generation process) to classical processing unit 2050 via a data path 2022. In some embodiments, resource state generators 2010 can be maintained at cryogenic temperatures (e.g., 4 K). Delay circuit 2020 can include optical fibers, other waveguides, optical memory, or other components to delay or store photons corresponding to particular qubits by appropriate delay times, such as 1 clock cycle, L clock cycles, and $L^2$ clock cycles, where L may be any integer number. Delay circuits 2020 may not need to operate at cryogenic temperatures. Photons exiting delay circuits 2020 can be delivered to switch circuits 2030 via, for example, optical fibers, on-chip waveguides, or any other type of waveguides or optical interconnects.

Switch circuits 2030 may include active switches and waveguides to perform mode coupling, mode swapping, phase shift, and other operations on the qubits. In various embodiments, switch circuits 2030 may perform mode coupling operations associated with fusion operations as described below and/or basis selection operations associated with measurement of individual qubits. In some embodiments, switch circuits 2030 may be dynamically reconfigurable in response to control signals from classical processing units 2050, and thus quantum computing system 2000 may perform different computations by reconfiguring switches in switch circuits 2030. Switching circuits 2030 may deliver output photons to detectors 2040 via, for example, optical fibers, on-chip waveguides, or any other type of optical interconnects.

Detectors 2040 may include photon detectors capable of detecting single or multiple photons. Each photon detector may be coupled to one waveguide and may generate an output (classical) signal indicating whether a photon was detected. In some embodiments, some or all detectors 2040 may be capable of counting photons, and the output signal from each detector 2040 may indicate the number of photons detected by the detector 2040. In some embodiments, detectors 2040 may operate at cryogenic temperatures. Detectors 2040 may provide classical output signals indicating the number of photons, or binary signals indicating whether a photon was detected, to classical processing unit 2050 via a signal path 2024, such as optical fibers.

Classical processing unit 2050 may be a classical computer system that is capable of communicating with resource state generator(s) 2010, switch circuits 2030, and detectors 2040 using classical digital logic signals. In some embodiments, classical processing unit 2050 may determine appropriate settings for switch circuits 2030 based on a particular quantum computation (or program) to be executed. Classical processing unit 2050 may receive feedback signals (e.g., measurement outcomes) from resource state generators 2010 and detectors 2040 and can determine the result of the computation based on the feedback signals. In some embodiments, classical processing unit 2050 can use feedback signals to modify subsequent control signals sent to switch circuits 2030. Operation of classical processing unit 2050 may incorporate error correction algorithms and other techniques.

Quantum computing system 2000 of FIG. 20 is illustrative, and variations and modifications are possible. Blocks shown separately can be combined, or a single block can be implemented using multiple distinct components. Resource state generator(s) 2010, delay circuits 2020, switch circuits 2030, and detectors 2040 can implement the circuits descried above and below for generating entanglement structures. For instance, delay circuits 2020 may implement delay lines for resource state fusion, while switch circuits 2030 may implement reconfigurable switches and mode couplers associated with reconfigurable fusion, and detectors 2040 may implement destructive measurements associated with fusion operations. Quantum computing system 2000 is just one example of a quantum computing system or another photonic system that can use the wafer-scale modules described herein. Those skilled in the art will appreciate that many different systems can be implemented using the wafer-scale modules that each include PIC or EPIC dies bonded to and optically coupled to an optical backplane having low-loss waveguides.

Figure 21:
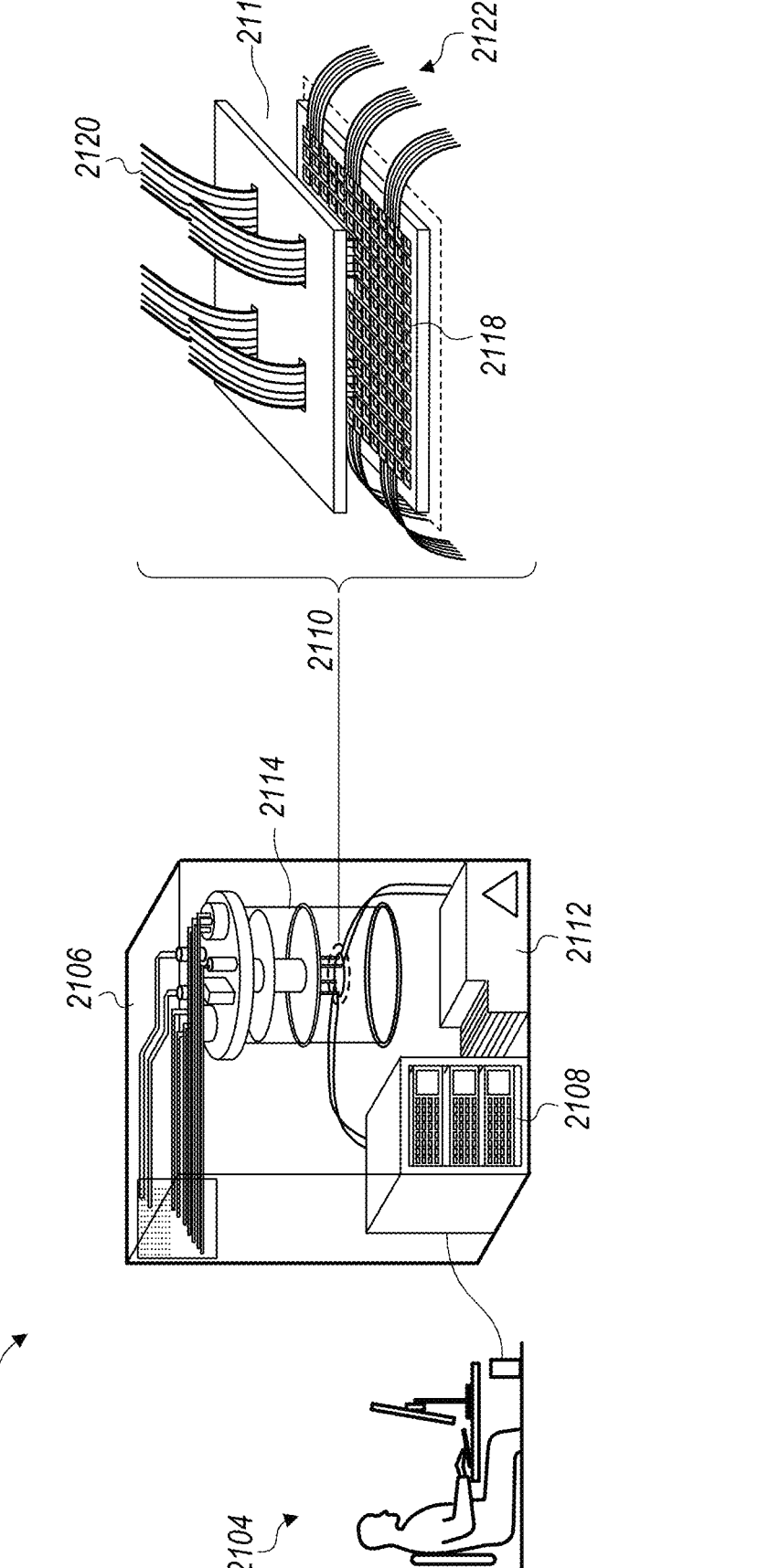
FIG. 21 is a simplified system block diagram of an example of a hybrid quantum computing system according to certain embodiments.

FIG. 21 is a simplified system block diagram of an example of a hybrid QC system 2100 including electro-optic devices (e.g., switches) according to certain embodiments. In order to operate at low temperatures, for example liquid helium temperatures, embodiments of the present disclosure integrate the electro-optic switches discussed herein into a system that includes cooling systems. Thus, embodiments of the present disclosure provide a hybrid computing system, for example, as illustrated in FIG. 21. The hybrid quantum computing (QC) system 2100 includes a user interface device 2104 that is communicatively coupled to a hybrid quantum computing subsystem 2106. The user interface device 2104 can be any type of user interface device, e.g., a terminal including a display, keyboard, mouse, touchscreen and the like. In addition, the user interface device can itself be a computer such as a personal computer (PC), laptop, tablet computer and the like. In some embodiments, the user interface device 2104 provides an interface with which a user can interact with the hybrid QC subsystem 2106. For example, the user interface device 2104 may run software, such as a text editor, an interactive development environment (IDE), command prompt, graphical user interface, and the like so that the user can program, or otherwise interact with, the QC subsystem to run one or more quantum algorithms. In other embodiments, the hybrid QC subsystem 2106 may be pre-programmed and the user interface device 2104 may simply be an interface where a user can initiate a quantum computation, monitor the progress, and receive results from the hybrid QC subsystem 2106. Hybrid QC subsystem 2106 further includes a classical computing system 2108 coupled to one or more quantum computing chips 2110. In some examples, the classical computing system 2108 and the quantum computing chip 2110 can be coupled to other electronic components 2112, e.g., pulsed pump lasers, microwave oscillators, power supplies, networking hardware, etc.

In some embodiments that utilize cryogenic operation, the quantum computing system 2100 can be housed within a cryostat, e.g., cryostat 2114. In some embodiments, the quantum computing chip 2110 can include one or more constituent chips, e.g., hybrid electronic chip 2116 and integrated photonics chip 2118, which may include various waveguide structures and/or EO devices disclosed herein. Signals can be routed on- and off-chip any number of ways, e.g., via optical interconnects 2120 and via other electronic interconnects 2122. In addition, the hybrid quantum computing system 2100 may employ a quantum computing process, e.g., measurement-based quantum computing (MBQC) that employs one or more cluster states of qubits.

The following are example embodiments:

Example 1: A system comprising: a first photonic integrated circuit comprising: a qubit encoder configured to receive a spatial-mode qubit and convert the spatial-mode qubit to a temporal-mode qubit; an optical interconnect configured to receive and transmit the temporal-mode qubit; and a second photonic integrated circuit comprising: a qubit decoder configured to receive the temporal-mode qubit and convert the temporal-mode qubit back into the spatial-mode qubit.

Example 2: The system of Example 1, further comprising: a first control circuit configured to control the qubit encoder; and a second control circuit configured to control the qubit decoder, wherein the second control circuit is synchronized with the first control circuit.

Example 3: The system of Example 1 or Example 2, wherein the qubit encoder includes: a dual-rail qubit bus optically coupled to a qubit source, the dual-rail qubit bus including two waveguides, wherein a first waveguide of the dual-rail qubit bus includes a delay line; and an optical switch optically connected to the two waveguides of the dual-rail qubit bus.

Example 4: The system of any one of Examples 1-3, wherein the spatial-mode qubit is generated by a qubit source, wherein the qubit source comprises a clock generator configured to generate a clock signal using pump laser pulses.

Example 5: The system of any one of Examples 1-4, further comprising an electrical interconnect channel or an optical interconnect channel configured to send the clock signal to the second photonic integrated circuit.

Example 6: The system of any one of Examples 1-5, wherein the qubit encoder comprises a first dual-rail qubit bus that comprises a first set of waveguides, one of the first set of waveguides comprising a first delay, and wherein the qubit decoder comprises a second dual-rail qubit bus that comprises a second set of waveguides, one of the second set of waveguides comprising a second delay.

Example 7: The system of any one of Examples 1-6, further comprising: a phase shifter to compensate for phase differences between the first delay and the second delay.

Example 8: The system of any one of Examples 1-7, wherein the phase shifter is in a switch of the qubit encoder in the first photonic integrated circuit.

Example 9: The system of any one of Examples 1-8, wherein the spatial-mode qubit corresponds to a dual-rail encoded photonic qubit.

Example 10: The system of any one of Examples 1-9, wherein the optical interconnect comprises optical fiber.

Example 11: The system of any one of Examples 1-10, wherein the optical interconnect is a waveguide of an optical interposer that is coupled to the first photonic integrated circuit and the second photonic integrated circuit.

Example 12: A photonic integrated circuit device comprising: a dual-rail qubit bus optically coupled to a photonic qubit source, the dual-rail qubit bus including two waveguides, wherein a first waveguide of the dual-rail qubit bus includes a waveguide delay line that is disposed in a first layer of the photonic integrated circuit device; an optical switch, disposed in a second layer of the photonic integrated circuit and optically connected to the two waveguides of the dual-rail qubit bus; and a control circuit configured to switch the optical switch to optically connect output portions of the two waveguides to a single output waveguide of the photonic integrated circuit at different times, wherein the control circuit is synchronized with the photonic qubit source.

Example 13: The photonic integrated circuit device of Example 12, wherein the photonic qubit source includes a clock generator configured to generate a clock signal using pump laser pulses.

Example 14: The photonic integrated circuit device of Example 12 or Example 13, wherein the waveguide delay line is characterized by a delay that is equal to or less than a half of a clock period of the clock signal.

Example 15: The photonic integrated circuit device of any one of Examples 12-14, wherein the waveguide delay line is characterized by a delay that is between 25 ps and 500 ps.

Example 16: The photonic integrated circuit device of any one of Examples 12-15, wherein the control circuit is controlled by a feedforward control signal generated by the photonic qubit source when photon pairs are generated.

Example 17: The photonic integrated circuit device of any one of Examples 12-16, wherein the optical switch includes a Mach-Zehnder interferometer.

Example 18: The photonic integrated circuit device of any one of Examples 12-17, wherein the optical switch is controlled by a clock signal characterized by a frequency that is at least twice of a clock frequency of the photonic qubit source.

Example 19: A method comprising: converting a spatial-mode qubit to a temporal-mode qubit using an optical delay and a switch of a first photonic integrated circuit; transmitting, on an optical interconnect, the temporal-mode qubit from the first photonic integrated circuit to a second photonic integrated circuit, the optical interconnect being coupled to the first photonic integrated circuit and the second photonic integrated circuit; and converting, on the second photonic integrated circuit, the temporal-mode qubit back into the spatial-mode qubit.

Example 20: The method of Example 19, wherein the optical interconnect comprises optical fiber.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter is not limited to the particular examples disclosed, but that such claimed subject matter may also include all aspects falling within the scope of appended claims, and equivalents thereof.

What is claimed is:

1. A system comprising:
a wafer comprising an optical backplane;
a first integrated circuit bonded to the optical backplane, the first integrated circuit comprising:
a first photonic integrated circuit (PIC) on a first PIC die, the first PIC including a qubit encoder that converts a spatial-mode qubit into a temporal-mode qubit; and
a first electronic integrated circuit (EIC) on a first EIC die bonded and electrically connected to the first PIC die and configured to control the first PIC;
an optical interconnect optically coupled to the first PIC and a second PIC, the optical interconnect configured to transmit the temporal-mode qubit; and
a second integrated circuit distinct from the first integrated circuit and bonded to the optical backplane, the second integrated circuit comprising:
a second PIC on a second PIC die, the second PIC including a qubit decoder that converts the temporal-mode qubit transmitted by the optical interconnect back into the spatial-mode qubit; and a second EIC on a second EIC die bonded and electrically connected to the second PIC and configured to control the second PIC.

2. The system of claim 1, wherein:
the first EIC comprises a first control circuit that controls the qubit encoder;
the second EIC comprises a second control circuit that controls the qubit decoder; and
the second control circuit is synchronized with the first control circuit through an electrical interconnect or an optical channel.

3. The system of claim 1, wherein the qubit encoder comprises:
a dual-rail qubit bus optically coupled to a qubit source, the dual-rail qubit bus including two waveguides, a first waveguide of the dual-rail qubit bus including a first delay line; and
an optical switch optically coupled to the two waveguides of the dual-rail qubit bus.

4. The system of claim 3, wherein:
the spatial-mode qubit is generated by a qubit source using pump laser pulses; and
the qubit source comprises a clock generator configured to generate a clock signal using the pump laser pulses.

5. The system of claim 4, wherein the first delay line is characterized by a delay that is equal to or less than a half of a clock period of the clock signal.

6. The system of claim 4, wherein the first EIC includes a timing circuit configured to generate, using the clock signal, a control signal for controlling the optical switch of the qubit encoder.

7. The system of claim 3, wherein the qubit decoder comprises a second dual-rail qubit bus that comprises a set of waveguides, one waveguide of the set of waveguides comprising a second delay line.

8. The system of claim 7, further comprising a phase shifter configured to compensate a difference between the first delay line and the second delay line.

9. The system of claim 8, wherein the phase shifter is in the optical switch of the qubit encoder.

10. The system of claim 1, wherein the spatial-mode qubit comprises a dual-rail encoded photonic qubit.

11. The system of claim 1, wherein the optical interconnect comprises an optical fiber.

12. The system of claim 1, wherein the optical interconnect comprises a waveguide of an optical interposer that is coupled to the first PIC and the second PIC.

13. The system of claim 1, wherein:
the first EIC is electrically connected to the first PIC through an electrical redistribution layer;
the second EIC is electrically connected to the second PIC through the electrical redistribution layer; and
the electrical redistribution layer includes an electrical interconnect coupled between the first EIC and the second EIC.

14. An integrated circuit device comprising:
a dual-rail qubit bus optically coupled to a photonic qubit source, the dual-rail qubit bus including two waveguides, a first waveguide of the dual-rail qubit bus including a waveguide delay line that is disposed in a first physical waveguide layer of the integrated circuit device;
an optical switch disposed in a second physical waveguide layer of the integrated circuit device and optically coupled to the two waveguides of the dual-rail qubit bus, the first waveguide layer and the second waveguide layer being different physical waveguide layers that are vertically separated on a same substrate; and a control circuit synchronized with the photonic qubit source and configured to switch the optical switch to selectively couple outputs of the two waveguides to a single output waveguide of the integrated circuit device.

15. The integrated circuit device of claim 14, wherein the photonic qubit source includes a clock generator configured to generate a clock signal using pump laser pulses.

16. The integrated circuit device of claim 15, wherein the control circuit is configured to control the optical switch using a control signal having a frequency that is at least twice of a clock frequency of the clock signal.

17. The integrated circuit device of claim 15, wherein the waveguide delay line is characterized by a delay that is equal to or less than a half of a clock period of the clock signal.

18. The integrated circuit device of claim 14, wherein the waveguide delay line is characterized by a delay that is between 25 ps and 500 ps.

19. The integrated circuit device of claim 14, wherein the control circuit is controlled by a feedforward control signal generated by the photonic qubit source when photon pairs are generated.

20. The integrated circuit device of claim 14, wherein the optical switch includes a Mach-Zehnder interferometer.

21. The system of claim 1, wherein the qubit encoder in the first PIC comprises first optical paths, wherein the qubit decoder in the second PIC comprises second optical paths, and wherein the second optical paths balance an optical loss of the first paths such that the spatial-mode qubit that is output by the qubit decoder in the second PIC has approximately equal optical power in each mode of the spatial-mode qubit.

* * * * *